US012585169B2

(12) United States Patent　　　　(10) Patent No.:　US 12,585,169 B2
　　Kamiya et al.　　　　　　　　　　(45) Date of Patent:　Mar. 24, 2026

(54) IMAGING APPARATUS

(71) Applicant: FUJIFILM Corporation, Tokyo (JP)

(72) Inventors: Takeshi Kamiya, Saitama (JP); Shoki Kasahara, Saitama (JP)

(73) Assignee: FUJIFILM Corporation, Tokyo (JP)

( * ) Notice:　Subject to any disclaimer, the term of this patent is extended or adjusted under 35 U.S.C. 154(b) by 171 days.

(21) Appl. No.: 18/159,947

(22) Filed:　Jan. 26, 2023

(65)　　　　Prior Publication Data

US 2023/0176448 A1　　Jun. 8, 2023

Related U.S. Application Data

(63) Continuation　of　application　No. PCT/JP2021/008194, filed on Mar. 3, 2021.

(30)　　Foreign Application Priority Data

Jul. 30, 2020　(JP) ................................. 2020-128890

(51) Int. Cl.
　　*G03B 13/06*　　　(2021.01)
　　*G02C 7/02*　　　(2006.01)
　　　　　　(Continued)

(52) U.S. Cl.
　　CPC ............... *G03B 13/06* (2013.01); *G02C 7/02* (2013.01); *G02F 1/29* (2013.01); *H04N 23/63* (2023.01)

(58) Field of Classification Search
　　CPC .......... G03B 13/06; H04N 23/63; G02C 7/02; G02F 1/29
　　See application file for complete search history.

(56)　　　　References Cited

U.S. PATENT DOCUMENTS 5,619,739　A　　4/1997　Kawabata
2012/0154660　A1　6/2012　Hirayama
　　　　　　(Continued)

FOREIGN PATENT DOCUMENTS

JP　　　S61-4034　A　　1/1986
JP　　H07-333690　A　　12/1995
　　　　　　(Continued)

OTHER PUBLICATIONS

International Search Report issued in PCT/JP2021/008194; mailed May 25, 2021.
　　　　　　(Continued)

*Primary Examiner* — Lin Ye
*Assistant Examiner* — Fayez A Bhuiyan
(74) *Attorney, Agent, or Firm* — Studebaker Brackett PLLC

(57)　　　　ABSTRACT

An imaging apparatus of the present invention includes an imaging element, an observation unit that includes a correction lens for correcting a ray angle incident on an eye of a user, and with which a target to be imaged of the imaging element is observable, a storage unit that stores data related to astigmatism of the user, and a processor that controls the correction lens. The processor is configured to execute readout processing of reading out the data from the storage unit storing the data related to the astigmatism of the user, determination processing of determining an inclination of a second direction of the imaging element with respect to a first direction of the eye of the user, and adjustment processing of adjusting a correction amount of the ray angle by the correction lens based on the data read out by the readout processing and a result determined by the determination processing.

21 Claims, 18 Drawing Sheets

(51) Int. Cl.
    *G02F 1/29*     (2006.01)
    *H04N 23/63*     (2023.01)

(56)           References Cited

U.S. PATENT DOCUMENTS

| | | |
|---|---|---|
| 2013/0100410 A1 | 4/2013 | Liang |
| 2017/0245758 A1* | 8/2017 | Liang .................... A61B 3/036 |
| 2017/0302849 A1 | 10/2017 | Muschaweck |
| 2020/0174284 A1 | 6/2020 | Chan et al. |

FOREIGN PATENT DOCUMENTS

| | | |
|---|---|---|
| JP | H08-286144 A | 11/1996 |
| JP | H11-109260 A | 4/1999 |
| JP | H11-355618 A | 12/1999 |
| JP | 2002-122784 A | 4/2002 |
| JP | 2003-169247 A | 6/2003 |
| JP | 2004-245910 A | 9/2004 |
| JP | 2008-158195 A | 7/2008 |
| JP | 2009-103811 A | 5/2009 |
| JP | 2010-226193 A | 10/2010 |
| JP | 2012-134680 A | 7/2012 |
| JP | 2014-232158 A | 12/2014 |

OTHER PUBLICATIONS

International Preliminary Report On Patentability and Written Opinion issued in PCT/JP2021/008194; issued Jan. 31, 2023.

An Office Action mailed by China National Intellectual Property Administration on May 28, 2025, which corresponds to Chinese Patent Application No. 202180058672.6 and is related to U.S. Appl. No. 18/159,947; with English language translation.

An Office Action mailed by China National Intellecual Property Aministration on Dec. 8, 2025, which correponds to Chinese Patent Application No. 202180058672.6 and is related to U.S. Appl. No. 18/159,947; with English language translation.

\* cited by examiner

FIG. 5

MONTH 00 DAY 00 YEAR 00    PRESCRIPTION SLIP FOR GLASSES

NAME                        AGE              ADDRESS

|         |       | Sph   | Cyl   | AX  | PRISM | BASE | PD | NOTE |
|---------|-------|-------|-------|-----|-------|------|----|------|
| DISTANT | RIGHT | -3.50 | -0.50 | 180 |       |      | 32 |      |
|         | LEFT  | -3.50 |       |     |       |      | 32 |      |
| NEAR    | RIGHT |       |       |     |       |      |    |      |
|         | LEFT  |       |       |     |       |      |    |      |

FIG. 7

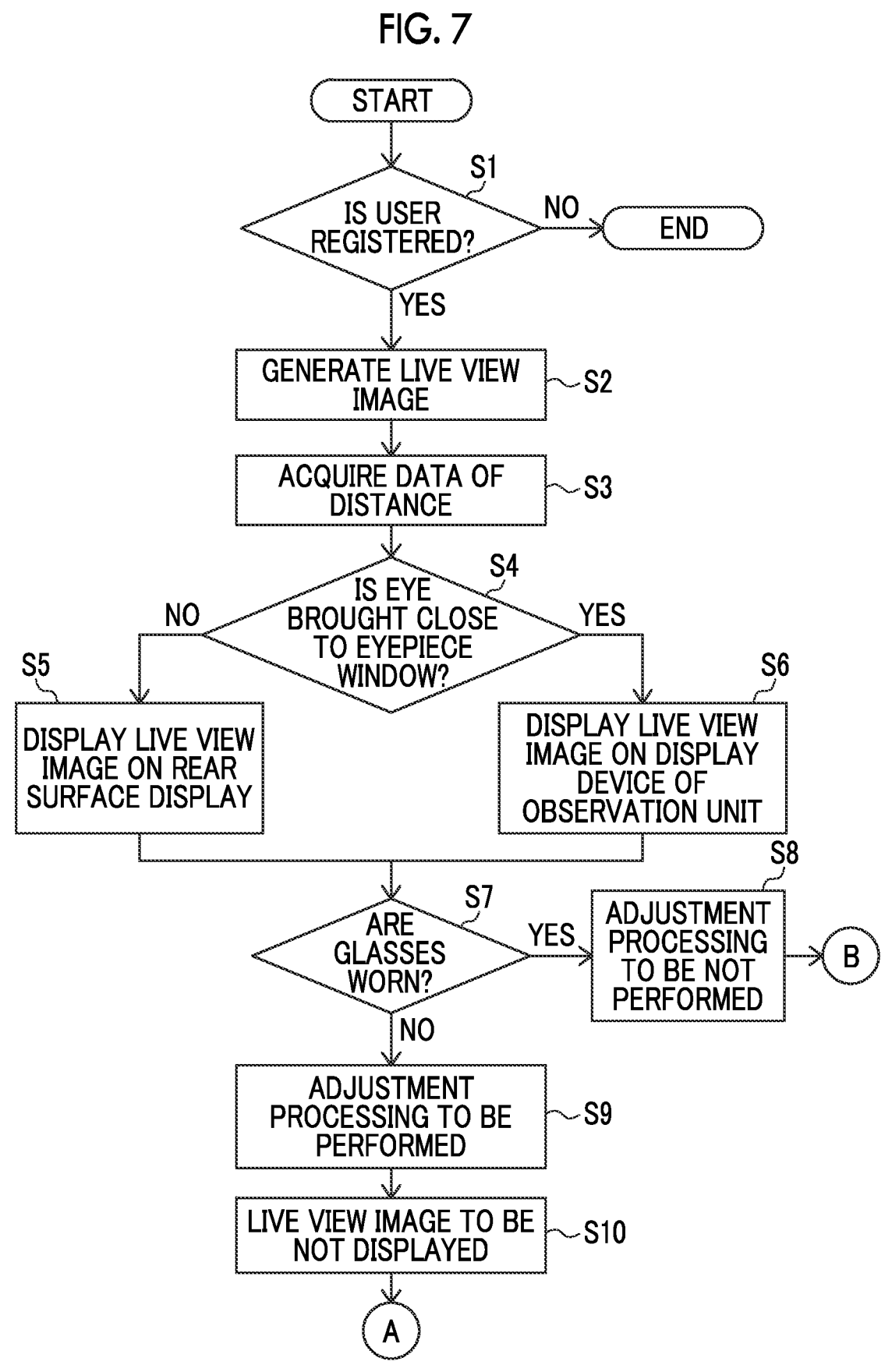

START

S1
IS USER REGISTERED? — NO → END

YES

GENERATE LIVE VIEW IMAGE — S2

ACQUIRE DATA OF DISTANCE — S3

S4
IS EYE BROUGHT CLOSE TO EYEPIECE WINDOW?

NO ← S5
DISPLAY LIVE VIEW IMAGE ON REAR SURFACE DISPLAY

YES → S6
DISPLAY LIVE VIEW IMAGE ON DISPLAY DEVICE OF OBSERVATION UNIT

S7
ARE GLASSES WORN? — YES → S8 ADJUSTMENT PROCESSING TO BE NOT PERFORMED → B

NO

ADJUSTMENT PROCESSING TO BE PERFORMED — S9

LIVE VIEW IMAGE TO BE NOT DISPLAYED — S10

PRESCRIPTION SLIP FOR GLASSES

MONTH OO DAY OO YEAR OO

NAME _____ AGE _____ ADDRESS _____

| | | Sph | Cyl | AX | PRISM | BASE | PD | NOTE |
|---|---|---|---|---|---|---|---|---|
| DISTANT | RIGHT | −5.00 | −0.50 | 170 | | | 62 | |
| | LEFT | −4.50 | −1.00 | 175 | | | 62 | |
| NEAR | RIGHT | −4.00 | −0.50 | 170 | | | 58 | |
| | LEFT | −3.50 | −1.00 | 175 | | | 58 | |

FIG. 13

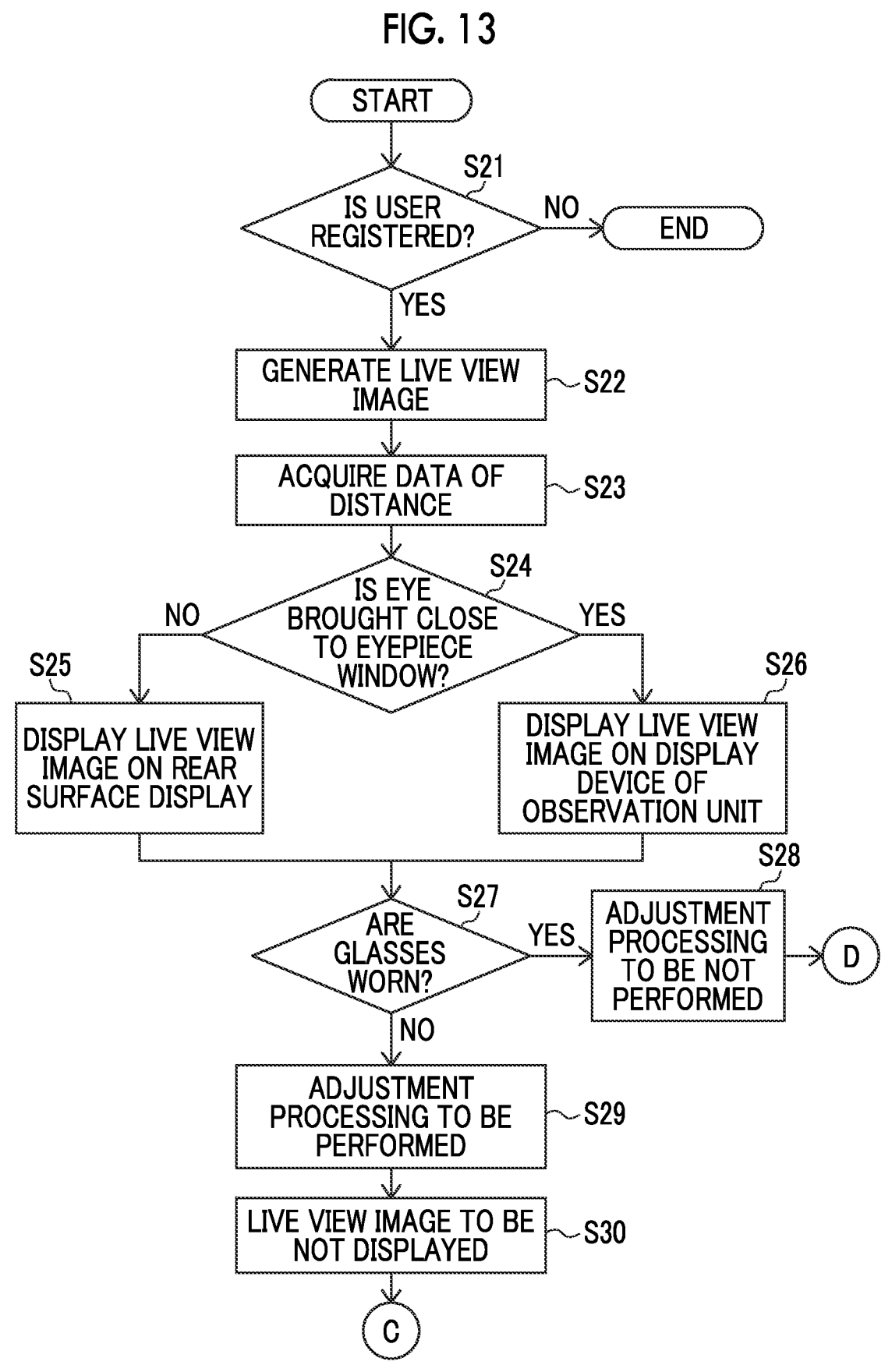

START

S21
IS USER
REGISTERED? —— NO —— END

YES

GENERATE LIVE VIEW
IMAGE ~ S22

ACQUIRE DATA OF
DISTANCE ~ S23

S24
IS EYE
BROUGHT CLOSE
TO EYEPIECE
WINDOW?

NO ———————— YES

S25
DISPLAY LIVE VIEW
IMAGE ON REAR
SURFACE DISPLAY

S26
DISPLAY LIVE VIEW
IMAGE ON DISPLAY
DEVICE OF
OBSERVATION UNIT

S27
ARE
GLASSES
WORN? —— YES ——

S28
ADJUSTMENT
PROCESSING
TO BE NOT
PERFORMED —— D

NO

ADJUSTMENT
PROCESSING TO BE
PERFORMED ~ S29

LIVE VIEW IMAGE TO BE
NOT DISPLAYED ~ S30

C

IMAGING APPARATUS

CROSS-REFERENCE TO RELATED APPLICATIONS

This application is a Continuation of PCT International Application No. PCT/JP2021/008194 filed on Mar. 3, 2021, which claims priority under 35 U.S.C. § 119(a) to Japanese Patent Application No. 2020-128890 filed on Jul. 30, 2020. The above applications are hereby expressly incorporated by reference, in its entirety, into the present application.

BACKGROUND OF THE INVENTION

1. Field of the Invention

The present invention relates to an imaging apparatus comprising an observation unit such as an electronic view finder (electrical view finder (EVF)) and an optical view finder (OVF) with which a target to be imaged can be observed.

2. Description of the Related Art

In a case where a user having astigmatism looks at inside an observation unit of an imaging apparatus, a shape of a target to be imaged looks distorted. Thus, a problem arises in that it is difficult to view the target to be imaged.

In addition, in a case where a user having presbyopia looks at inside the observation unit of the imaging apparatus, a nearby target to be imaged cannot be focused. Thus, a problem arises in that it is difficult to view the target to be imaged.

On the other hand, examples of a prior technology for adjusting the observation unit of the imaging apparatus, particularly, a lens inside the observation unit, based on information related to vision of the user include JP2004-245910A, JP2003-169247A, JP2008-158195A, JP1999-109260A (JP-H11-109260A), JP1995-333690A (JP-H07-333690A), JP2010-226193A, and JP2009-103811A.

SUMMARY OF THE INVENTION

In a case of adjusting the observation unit based on the information related to the vision of the user, for example, the adjustment needs to be appropriately performed by considering a situation and the like of the user such as a posture of the user and glasses used by the user.

An object of the present invention is to solve the problems of the technology of the related art and provide an imaging apparatus that can appropriately adjust the observation unit in accordance with a situation and the like of a user.

In order to accomplish the above object, one embodiment according to the present invention is an imaging apparatus comprising an imaging element, an observation unit that includes a correction lens for correcting a ray angle incident on an eye of a user, and with which a target to be imaged of the imaging element is observable, a storage unit that stores data related to astigmatism of the user, and a processor that controls the correction lens, in which the processor is configured to execute readout processing of reading out the data from the storage unit, determination processing of determining an inclination of a second direction with respect to a first direction of the eye of the user, and adjustment processing of adjusting a correction amount of the ray angle by the correction lens based on the data read out by the readout processing and a result of the determination processing.

Here, it is preferable that the processor is configured to acquire data related to an iris of the user and execute the determination processing based on the acquired data related to the iris.

In addition, it is preferable that the processor is configured to acquire data related to a three-dimensional shape of a face of the user and execute the determination processing based on the acquired data related to the three-dimensional shape of the face.

In addition, it is preferable that the data related to the astigmatism stored in the storage unit includes adjustment data for the correction amount of the ray angle, the processor is configured to read out the adjustment data from the storage unit in the readout processing and adjust the correction amount of the ray angle by the correction lens based on the adjustment data read out by the readout processing, in the adjustment processing, and the processor is configured to, in a case where the correction amount of the ray angle is manually adjusted by the user after the adjustment processing, update the adjustment data stored in the storage unit based on the correction amount of the ray angle manually adjusted by the user.

In addition, it is preferable that the processor is configured to execute specification processing of specifying whether or not the user is wearing glasses, and switch whether or not to perform the adjustment processing based on a result of the specification processing.

In addition, it is preferable that the observation unit includes a display device on which an image is displayed, and the processor is configured not to display the image on the display device during the execution of the adjustment processing.

In addition, it is preferable that the storage unit stores the data related to the astigmatism for a plurality of users, the processor is configured to execute identification processing of identifying a user in use who is using the imaging apparatus from the plurality of users, and the processor is configured to read out the data related to the astigmatism of the user in use identified by the identification processing from the storage unit and adjust the correction amount of the ray angle by the correction lens based on the data related to the astigmatism of the user in use.

In addition, another embodiment according to the present invention is an imaging apparatus comprising an imaging element, an observation unit that includes a correction lens for correcting a ray angle incident on an eye of a user, and with which a target to be imaged of the imaging element is observable, a storage unit that stores data corresponding to an optical characteristic of each region of a lens of glasses used by the user, and a processor that controls the correction lens, in which in the correction lens, a correction amount of the ray angle by the correction lens is adjustable for each region of the correction lens, and the processor is configured to execute readout processing of reading out the data from the storage unit, and adjustment processing of adjusting the correction amount of the ray angle by the correction lens for each region of the correction lens based on the data read out by the readout processing.

Here, it is preferable that the data stored in the storage unit is adjustment data corresponding to the optical characteristic of each region of the lens of the glasses based on data of a prescription slip corresponding to the glasses, and the processor is configured to read out the adjustment data from the storage unit in the readout processing.

In addition, it is preferable that the adjustment data is adjustment data of a single lens out of a pair of lenses of the glasses.

In addition, it is preferable that in a case where the lens of the glasses is divided into a plurality of regions in an up-down direction of the lens of the glasses, each of a plurality of regions in the correction lens is associated with at least one of the plurality of regions in the lens of the glasses, and the processor is configured to adjust the correction amount of the ray angle for each region of the correction lens based on data corresponding to the optical characteristic of the associated region among the plurality of regions in the lens of the glasses.

In addition, it is preferable that the observation unit includes a display device on which an image is displayed, and the processor is configured to execute correction processing of correcting the image displayed on the display device based on the data read out by the readout processing, and first display processing of displaying the image corrected by the correction processing on the display device.

In addition, it is preferable that the processor is configured to execute second display processing of controlling an image during the execution of the adjustment processing not to be displayed on the display device.

In addition, it is preferable that the storage unit stores adjustment data for the correction amount of the ray angle, the adjustment data for the correction amount of the ray angle includes first adjustment data corresponding to the optical characteristic of each region of the lens of the glasses worn by the user, and the processor is configured to execute specification processing of specifying whether or not the user is wearing glasses, and switch whether or not to perform the adjustment processing using the first adjustment data based on a result of the specification processing.

In addition, it is preferable that the storage unit stores the data for a plurality of users, the processor is configured to execute identification processing of identifying a user in use who is using the imaging apparatus from the plurality of users, and the processor is configured to read out the data of the user in use identified by the identification processing from the storage unit and adjust the correction amount of the ray angle by the correction lens based on the data of the user in use.

In addition, still another embodiment according to the present invention is an imaging apparatus comprising an imaging element, a first observation unit that includes a first correction lens for correcting a ray angle incident on an eye of a user, and with which a target to be imaged of the imaging element is observable, a connecting unit to which a second observation unit that includes a second correction lens for correcting the ray angle incident on the eye of the user, and with which the target to be imaged of the imaging element is observable is connectable, a storage unit that stores data based on the eye of the user with respect to correction of at least one correction lens out of the first correction lens or the second correction lens, and a processor that controls the at least one correction lens, in which the processor is configured to execute judgment processing of judging whether or not the second observation unit is connected to the connecting unit, and decision processing of deciding whether or not to adjust a correction amount of the ray angle by the at least one correction lens based on a result of the judgment processing.

Here, it is preferable that the processor is configured to, in a case where a determination that the second observation unit is connected to the connecting unit is made by the judgment processing, and the second correction lens is correctable, adjust the correction amount of the ray angle by the second correction lens instead of adjusting the correction amount of the ray angle by the first correction lens.

In addition, it is preferable that the processor is configured to, in a case where a determination that the second observation unit is connected to the connecting unit is made by the judgment processing, and the second correction lens is not correctable, not adjust the correction amount of the ray angle by the first correction lens.

In addition, it is preferable that the processor is configured to execute notification processing of notifying the user of at least one of whether or not the correction amounts of the ray angle by the first correction lens and the second correction lens are adjustable, or whether or not the correction amounts of the ray angle by the first correction lens and the second correction lens are adjusted.

In addition, still another embodiment according to the present invention is an imaging apparatus comprising an imaging element, an observation unit that includes a correction lens for correcting a ray angle incident on an eye of a user, and with which a target to be imaged of the imaging element is observable, a storage unit that stores data related to astigmatism of the user, and a processor that controls the correction lens, in which the correction lens, a correction amount of the ray angle by the correction lens is adjustable for each region of the correction lens, and the processor is configured to execute readout processing of reading out the data from the storage unit, and adjustment processing of adjusting the correction amount of the ray angle by the correction lens for each region of the correction lens based on the data read out by the readout processing.

Here, it is preferable that the storage unit stores the data related to the astigmatism for a plurality of users, the processor is configured to execute identification processing of identifying a user in use who is using the imaging apparatus from the plurality of users, and the processor is configured to read out the data related to the astigmatism of the user in use identified by the identification processing from the storage unit and adjust the correction amount of the ray angle by the correction lens based on the data related to the astigmatism of the user in use.

BRIEF DESCRIPTION OF THE DRAWINGS

FIG. 5 is a concept diagram of an example illustrating a prescription slip for glasses.

FIG. 7 is a flowchart of an example illustrating an operation of the imaging apparatus according to the first embodiment.

FIG. 11 is a concept diagram of another example illustrating the prescription slip for glasses.

FIG. 13 is a flowchart of an example illustrating an operation of the imaging apparatus according to the second embodiment.

DESCRIPTION OF THE PREFERRED EMBODIMENTS

Hereinafter, a preferred embodiment of the present invention will be described in detail with reference to the appended drawings. It should be noted that the embodiment described below is merely an example for facilitating understanding of the present invention and does not limit the present invention. That is, the present invention may be subjected to changes or improvements from the embodiment described below without departing from the gist thereof. In addition, the present invention includes equivalents thereof.

Configuration Example of Imaging Apparatus According to First Embodiment

Figure 1:
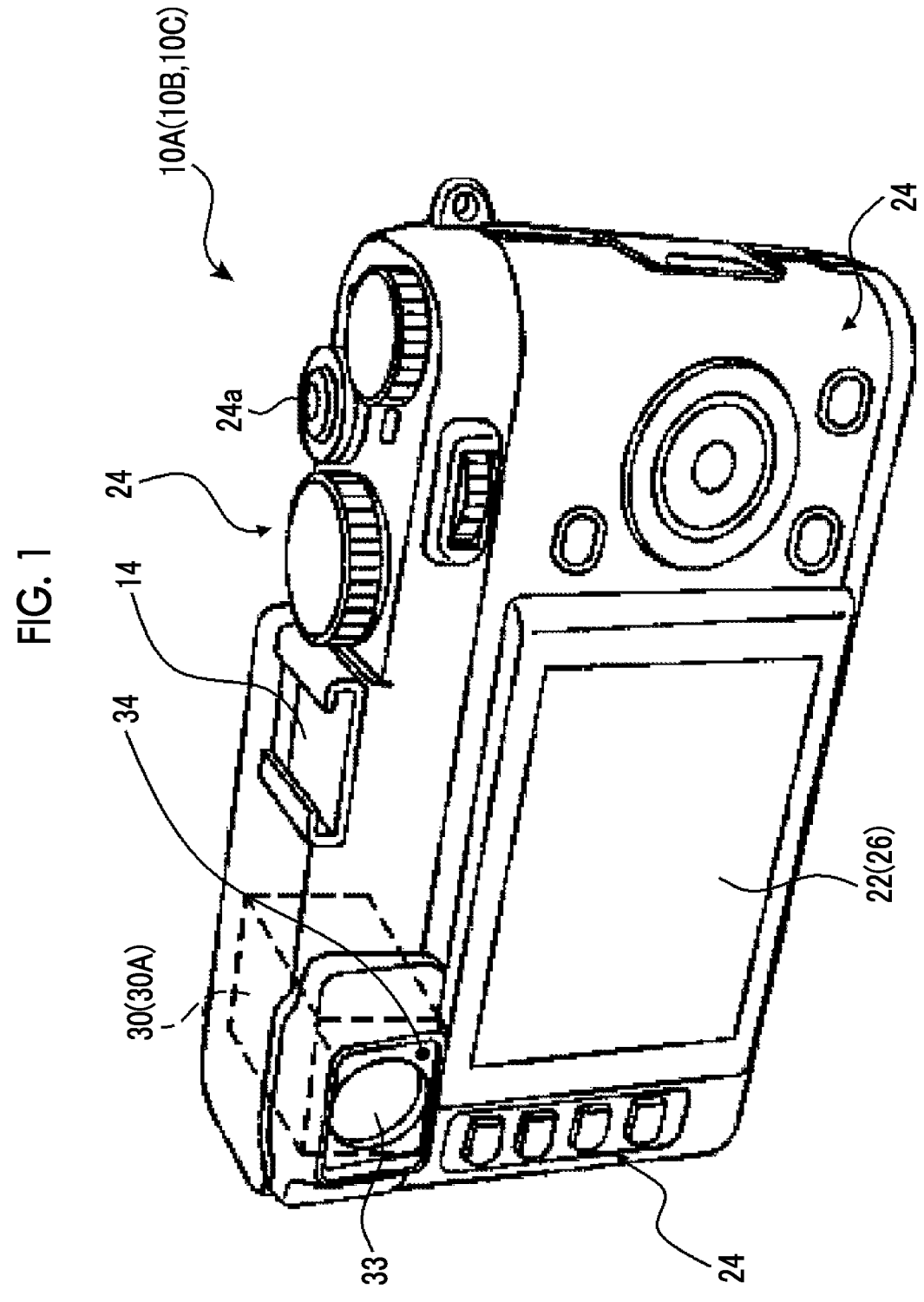
FIG. 1 is an external view of an imaging apparatus according to a first embodiment of the present invention.
Figure 2:
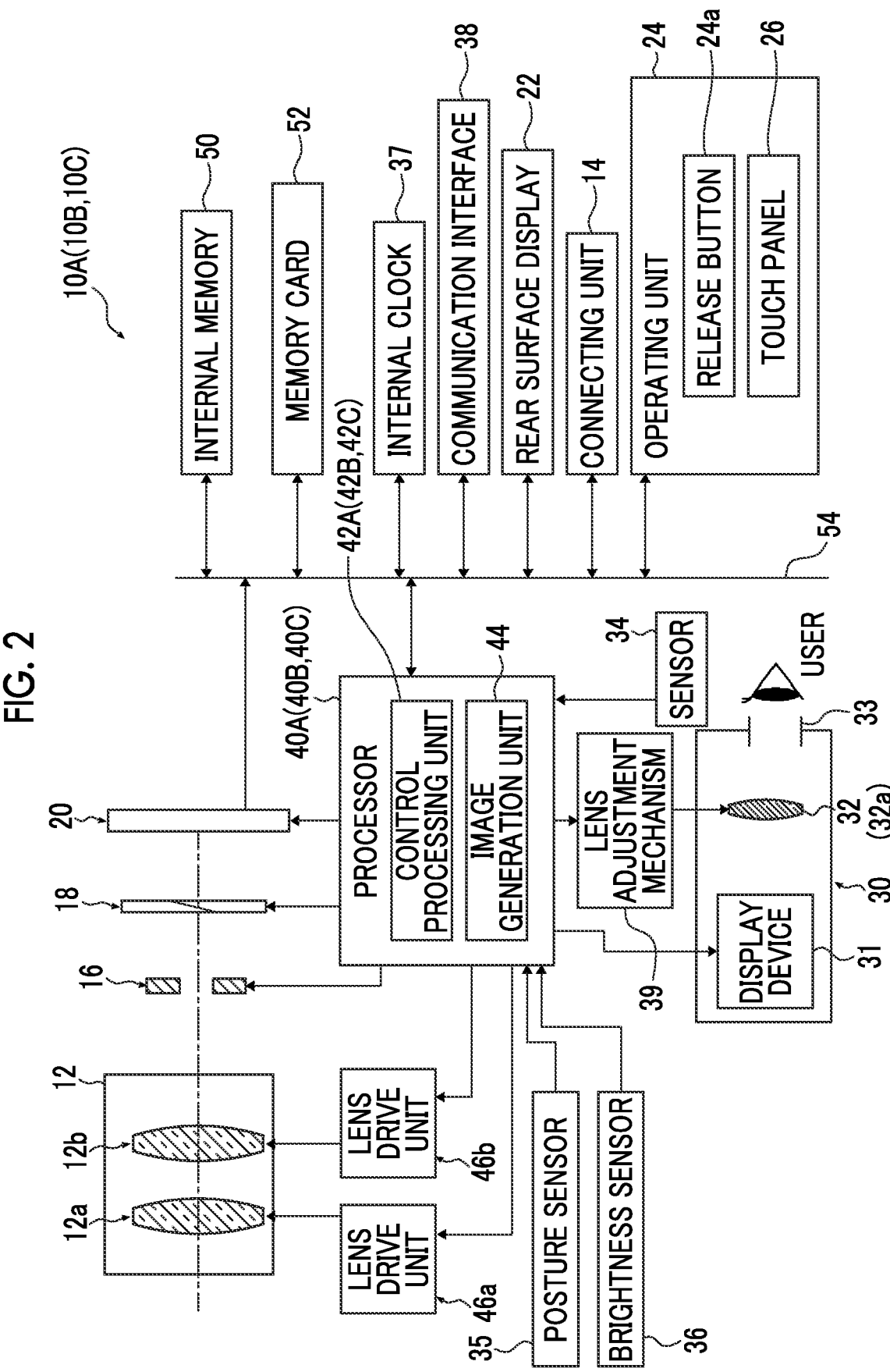
FIG. 2 is a block diagram illustrating an internal configuration of the imaging apparatus illustrated in FIG. 1.

FIG. 1 is an external view of an imaging apparatus (hereinafter, referred to as an imaging apparatus 10A) according to a first embodiment of the present invention. FIG. 2 is a block diagram illustrating an internal configuration of the imaging apparatus 10A illustrated in FIG. 1.

The imaging apparatus 10A is, for example, a digital camera and, as illustrated in FIGS. 1 and 2, comprises an imaging lens 12, a stop 16, a shutter 18, an imaging element 20, a connecting unit 14, a rear surface display 22, an operating unit 24, an observation unit 30, a lens adjustment mechanism 39, a sensor 34, a posture sensor 35, a brightness sensor 36, an internal clock 37, a communication interface 38, a processor 40A, lens drive units 46a and 46b, an internal memory 50, a memory card 52, and the like.

The connecting unit 14, the imaging element 20, the rear surface display 22, the operating unit 24, the internal clock 37, the communication interface 38, the processor 40A, the internal memory 50, and the memory card 52 are connected to each other through an internal bus 54 and can exchange data with each other.

As illustrated in FIG. 2, the imaging lens 12 includes a zoom lens 12a and a focus lens 12b. Each of the lenses 12a and 12b can be moved in an optical axis direction illustrated by a dash-dotted line in FIG. 2, by the lens drive units 46a and 46b subjected to a drive control by the processor 40A. A zooming operation is performed by the movement of the zoom lens 12a, and an auto focus (AF) operation is performed by the movement of the focus lens 12b.

The stop 16 is subjected to a drive control by the processor 40A and adjusts a light quantity of light (imaging light) incident on the imaging element 20. The shutter 18 is arranged between the stop 16 and the imaging element 20 and is subjected to an opening and closing control by the processor 40A. In the present embodiment, a mechanical shutter based on the shutter 18 and an electronic shutter based on the imaging element 20 are used together, and a shutter system can be switched by a user operation.

The imaging element 20 is an image sensor of a color imaging system including color filters of three colors of red, green, and blue (RGB) and is composed of a charged coupled device (CCD), a complementary metal oxide semiconductor (CMOS), or the like. The imaging element 20 comprises a plurality of pixels arranged in a two-dimensional matrix. Each pixel receives light of an image that is formed on a light-receiving surface through the imaging lens 12, the stop 16, and the shutter 18, converts the optical image into an imaging signal (electric signal) by photoelectric conversion, and outputs the imaging signal under a readout control of the processor 40A. In the present embodiment, the light-receiving surface composed of the plurality of pixels has an approximately rectangular shape that is long in a side-to-side direction of the imaging apparatus 10A so that imaging within a wide angle of view can be performed.

In the following description, imaging means imaging performed by the imaging element 20.

The connecting unit 14 is a part such as a hot shoe illustrated in FIG. 1 that connects an external device such as a flash and an external observation unit to the imaging apparatus 10A.

As illustrated in FIG. 1, the rear surface display 22 is provided on a rear surface of the imaging apparatus 10A and displays a live view image corresponding to the imaging signal output from the imaging element 20, a captured image, various types of information, and the like. The live view image is a real-time image (live view video) during imaging.

The operating unit 24 includes a plurality of buttons and the like provided on an outer surface of a housing of the imaging apparatus 10A and receives an operation of a user (capturing person) of the imaging apparatus 10A. In capturing an image or setting or changing various items related to imaging, the user performs a corresponding operation through the operating unit 24. In addition, as illustrated in FIG. 2, a touch panel 26 that receives a touch operation performed by the user may be provided on the rear surface display 22 as one operating unit 24.

The operating unit 24 includes a release button 24a illustrated in FIG. 1 and FIG. 2. In addition, the operating unit 24 includes a graphical user interface of the touch panel 26 for manually adjusting a correction amount of a ray angle by a correction lens (a liquid crystal lens or a liquid lens) 32a described later, a manual lens rotation mechanism, not illustrated, for manually rotating the correction lens (cylindrical lens) 32*a* in order to manually adjust the correction amount of the ray angle by the correction lens (cylindrical lens) 32*a*, and the like.

Figure 18:
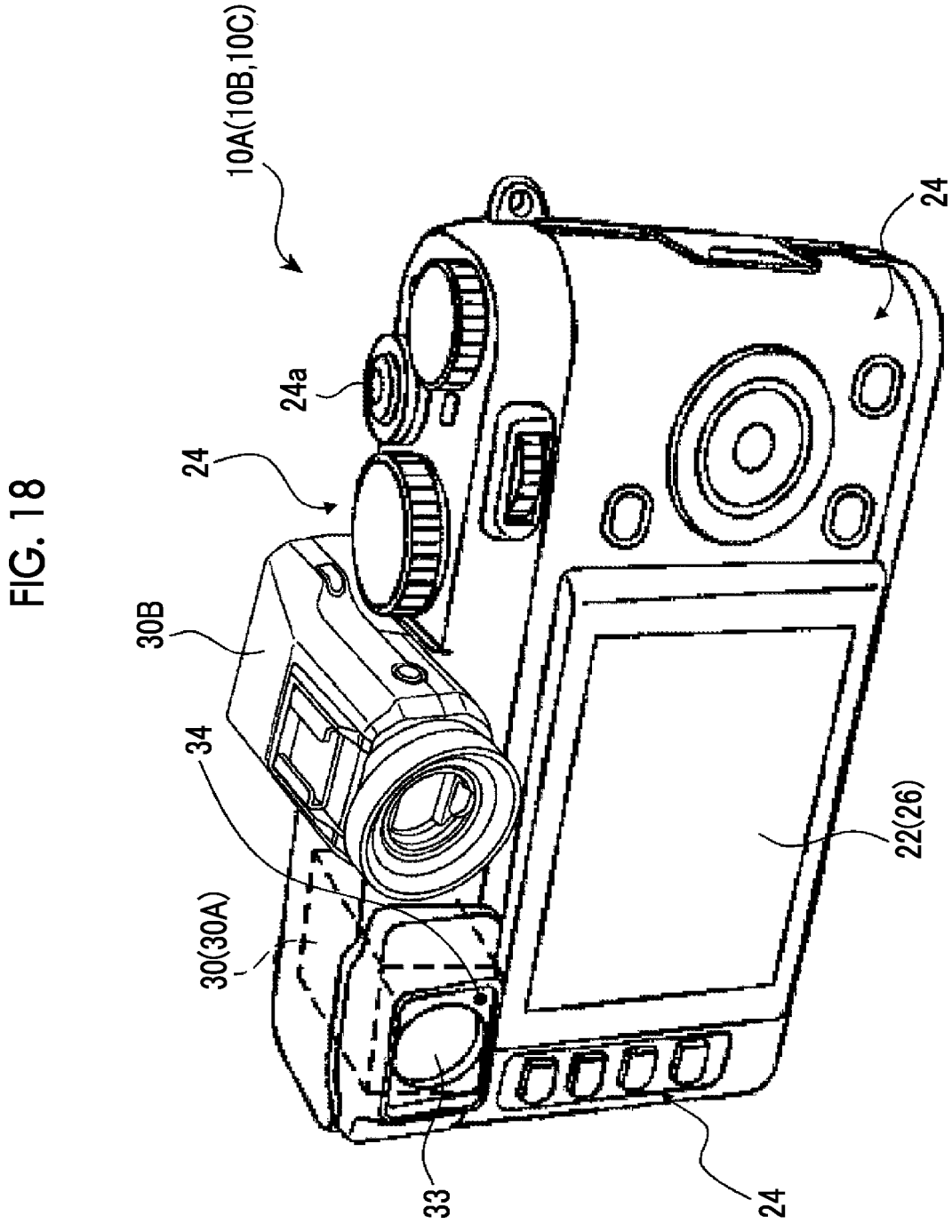
FIG. 18 is a concept diagram of an example illustrating a state where a second observation unit is connected to the imaging apparatus.

The observation unit 30 is a finder at which the user looks in order to check an angle of view, a focus state, and the like during imaging, and a target to be imaged by the imaging element 20 can be observed with the observation unit 30. In the present embodiment, the observation unit 30 is an EVF but may be an OVF or a hybrid type finder that can switch between an OVF mode and an EVF mode. In addition, the observation unit 30 may be a finder incorporated in the imaging apparatus 10A or may be a finder of an external type that is attachably and detachably connected to the connecting unit 14 (hot shoe) or the like provided in an upper portion of the imaging apparatus 10A as illustrated in FIG. 18.

As illustrated in FIG. 2, the observation unit 30 includes a display device 31, an observation optical system 32, and an eyepiece window 33.

The display device 31 displays the live view image and the like and is arranged inside the imaging apparatus 10A. The display device 31 is composed of, for example, a liquid crystal display (LCD), a plasma display panel (PDP), an organic electroluminescence (EL) display, a light emitting diode (LED) display, or an electronic paper.

The observation optical system 32 consists of a lens, a prism, and the like and is arranged between the display device 31 and the eyepiece window 33 in order to enlarge the image and the like displayed on the display device 31 or perform diopter adjustment of adjusting power in accordance with visual acuity of the user. In FIG. 2, while one lens is illustrated as the observation optical system 32, the observation optical system 32 may be composed of a plurality of lenses and the like.

In the present embodiment, the observation optical system 32 includes the correction lens 32*a* for correcting a ray angle (strictly, an emission angle of a luminous flux) of a ray incident on an eye of the user from the display device 31 in order to correct the visual acuity of the user to a normal state. In the correction lens 32*a*, optical power (power) of each portion can be changed by changing a refractive index of a ray passing through each portion of the lens. Here, the optical power is optical power (a degree of refraction) of each portion of the lens and is represented as 1/f in a case where a focal length is denoted by f. In the present embodiment, while a variable focus lens, more specifically, a liquid crystal lens, is used as the correction lens 32*a*, the present invention is not limited thereto. A liquid lens that is another variable focus lens, a cylindrical lens, or the like may also be used.

In the liquid crystal lens, liquid crystals are sealed in a lens holder, and optical power of the lens can be changed by applying a voltage to control alignment of liquid crystal molecules. Accordingly, the ray angle incident on the eye of the user can be corrected.

In the liquid lens, a conductive aqueous solution and nonconductive oil are sealed in a lens holder, and optical power of a boundary surface can be changed by applying a voltage to the aqueous solution to change a lens shape, specifically, a curvature of the boundary surface with the aqueous solution. Accordingly, the ray angle incident on the eye of the user can be corrected.

In the liquid crystal lens and the liquid lens, the optical power can be changed for each region. Accordingly, the correction amount of the ray angle can be adjusted for each region.

Figure 3:
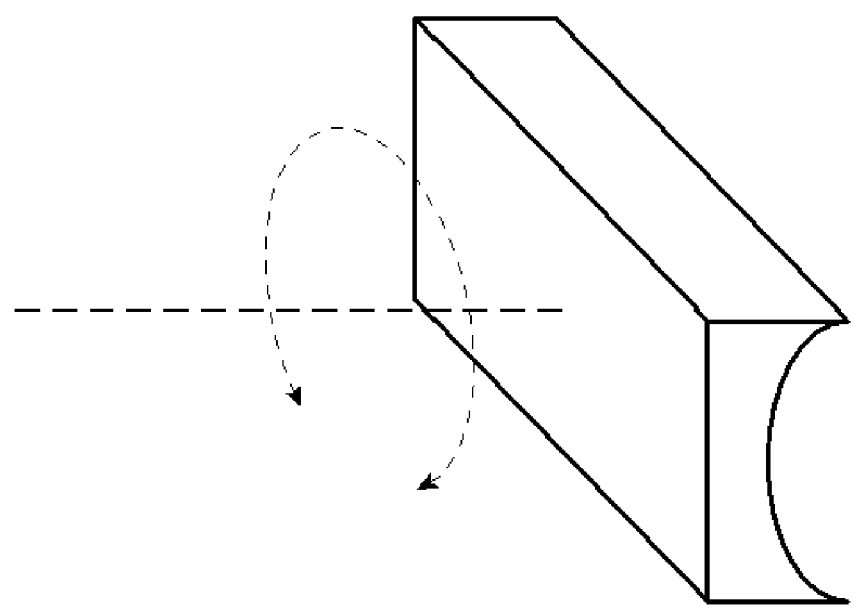
FIG. 3 is a concept diagram of an example illustrating a configuration of a cylindrical lens.

As illustrated in FIG. 3, the cylindrical lens is a concave lens having different curvature radii in directions of two orthogonal axes. In each portion of the lens, a ray incident from the optical axis direction is refracted with optical power corresponding to a curvature of each portion. In addition, by rotating the cylindrical lens with respect to an optical axis to change a direction of the lens, the ray angle incident on the eye of the user can be corrected.

The lens adjustment mechanism 39 applies an adjustment voltage for adjusting the optical power of each region in the lens to the correction lens 32*a* consisting of the liquid crystal lens under control of the processor 40A. Here, each region in the correction lens 32*a* is each region in a case where the lens is divided into a plurality of regions in two directions orthogonal to the optical axis of the lens.

In a case where the correction lens 32*a* is the liquid lens, the lens adjustment mechanism 39 acts in the same manner as in a case where the correction lens 32*a* is the liquid crystal lens. In addition, in a case where the correction lens 32*a* is the cylindrical lens, the lens adjustment mechanism 39 rotates the cylindrical lens with respect to the optical axis by driving an automatic lens rotation mechanism, not illustrated, under control of the processor 40A.

The posture sensor 35 detects the posture of the imaging apparatus 10A. For example, the posture sensor 35 detects whether the imaging apparatus 10A is in a side-to-side placed posture (a posture in which a longitudinal direction of the imaging element 20 is along a horizontal direction) or in a top-to-bottom placed posture (a posture in which the longitudinal direction of the imaging element 20 is along a vertical direction).

The posture sensor 35 is not particularly limited as long as the posture of the imaging apparatus 10A can be detected. Examples of the posture sensor 35 include an acceleration sensor that detects a movement of the imaging apparatus 10A, a gravity sensor that detects gravity, and a gyro sensor that detects rotation of the imaging apparatus 10A.

The brightness sensor 36 is a sensor that detects ambient brightness (light quantity) of the imaging apparatus 10A.

In addition, the sensor 34 illustrated in FIG. 1 and FIG. 2 is installed in a predetermined location in the eyepiece window 33 or near the eyepiece window 33. In the present embodiment, the sensor 34 outputs data of a distance from the user to the observation unit 30 (strictly, the eyepiece window 33), data related to an iris of the user, and the like. A well-known sensor for distance detection and iris detection can be used as the sensor 34. For example, an infrared sensor and an infrared camera can be used. A feature amount of the iris of the user can be specified using the data output from the sensor 34. In addition, it is possible to identify the user from the specified feature amount of the iris, determine whether or not the eye that looks at the observation unit 30 is a left eye or a right eye, or estimate a relative direction and the like between a face of the user in a case of looking at the observation unit 30 and the observation unit 30.

The sensor 34 is not limited to a sensor outputting the data related to the iris of the user and, for example, may acquire data related to a three-dimensional shape of the face of the user. In this case, a well-known sensor for three-dimensional shape detection can be used as the sensor 34. For example, a time of flight (TOF) camera can be used. According to the data related to the three-dimensional shape of the face of the user, for example, a position and the like of an eyelid of the user can be specified. Accordingly, it is possible to determine whether or not the eye that looks at the observation unit 30 is the left eye or the right eye, or estimate the relative direction and the like between the face of the user in a case of looking at the observation unit 30 and the observation unit 30.

Whether the eye of the user that looks at the observation unit 30 is the left eye or the right eye can also be determined from a rotation direction or a rotation angle in rotating the imaging apparatus 10A in a case where, for example, the user moves the imaging apparatus 10A from the side-to-side placed posture to the top-to-bottom placed posture or in a case where the user moves the imaging apparatus 10A to the opposite posture. In addition, the rotation direction or the rotation angle of the imaging apparatus 10A can be detected by the posture sensor 35.

In addition, the data of the distance from the user to the observation unit 30 can be acquired from the data acquired from the sensor 34.

For example, in a case where the sensor 34 is an infrared sensor, it is possible to irradiate the eye of the user with infrared light and acquire the data of the distance from the user to the observation unit 30 based on the reflected light.

In a case where the sensor 34 is an infrared camera, the data of the distance from the user to the observation unit 30 can be calculated by imaging the eye of the user with infrared light and specifying a size of the iris of the user by analyzing the infrared image.

In a case where the sensor 34 is a TOF camera, the face of the user is irradiated with a large amount of infrared dots from a dot projector, and a size of the eye of the user is specified from three-dimensional mapping data of the face of the user obtained based on the reflected light. Accordingly, the data of the distance from the user to the observation unit 30 can be calculated.

In a case where the distance from the user to the observation unit 30 is below a threshold value and is the same for a certain time, a judgment that the face of the user is present at a distance of looking at inside the observation unit 30 through the eyepiece window 33 can be made.

The sensor 34 is not particularly limited, and any sensor may be used as long as the data of the distance from the user to the observation unit 30 and the data related to the iris of the user, the data related to the three-dimensional shape of the face of the user, or the like can be acquired.

The internal clock 37 is a clock such as a real-time clock that continuously operates at all times by a battery, not illustrated, and outputs the current time point.

The communication interface 38 receives information and the like about an operating time in which the user operates the external device, from the external device.

A standard of the communication interface 38 is not particularly limited as long as the information about the operating time of the external device of the user can be received from the external device. Examples of the communication interface 38 include a universal serial bus (USB), Bluetooth (registered trademark), infrared data association (IrDA), and near field communication (NFC). In addition, the external device is not particularly limited as long as the information about the operating time of the external device of the user can be transmitted to the imaging apparatus 10A by the user. Examples of the external device include an information communication terminal and the like such as a personal computer or a smartphone of the user.

The processor 40A controls each unit of the imaging apparatus 10A and executes various types of processing including imaging, recording of data (image data) of the captured image, and display of the live view image, the captured image, and the like. In addition, the processor 40A executes processing (adjustment processing) of adjusting the correction amount of the ray angle by the correction lens 32a by controlling the lens adjustment mechanism 39.

The internal memory 50 is an example of a recording medium as a storage unit according to the embodiment of the present invention. The internal memory 50 stores a program executed by the processor 40A, various types of data, and the like.

Figure 4:
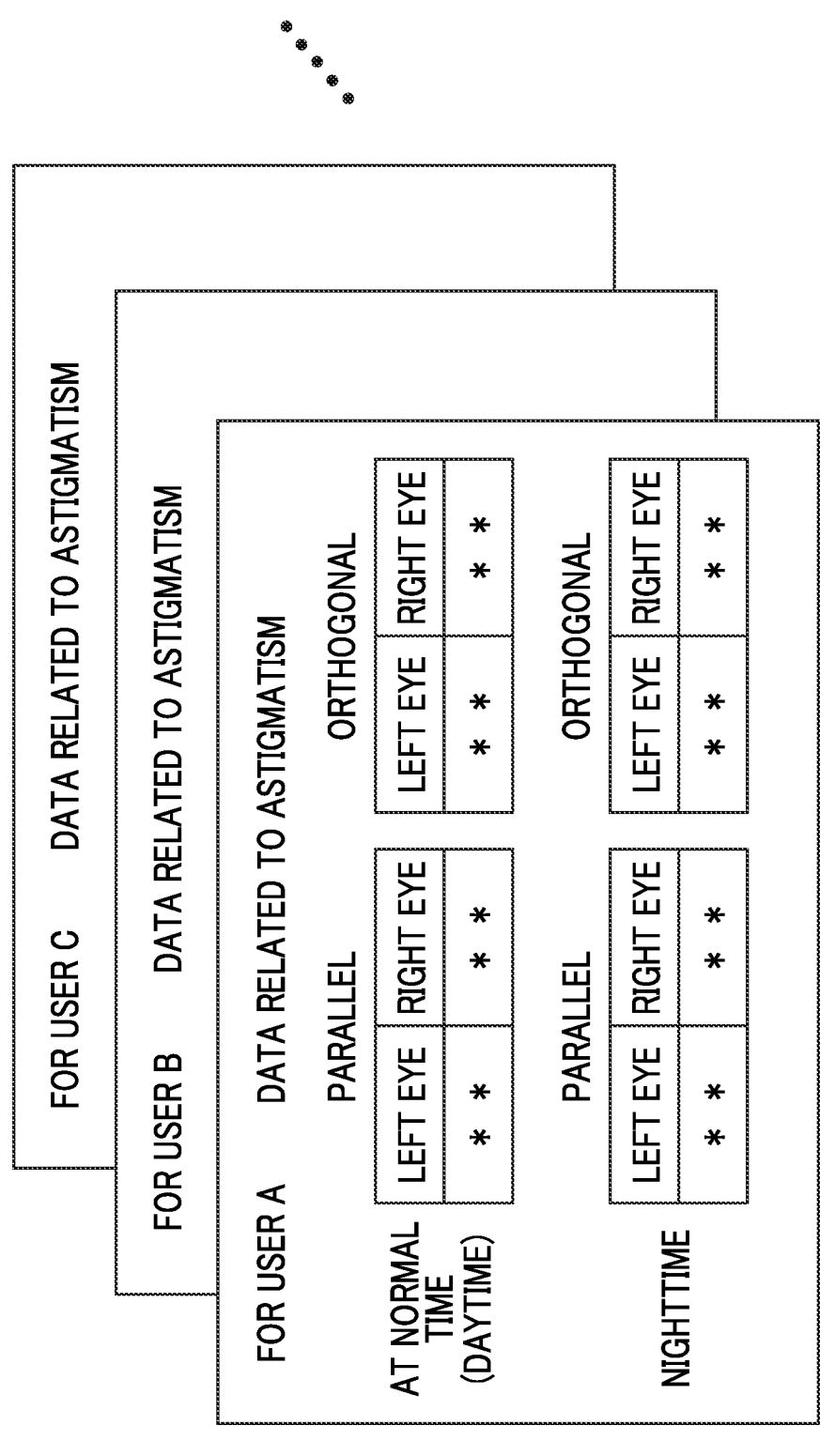
FIG. 4 is a concept diagram of an example illustrating data related to astigmatism of a plurality of users.

As illustrated in FIG. 4, the internal memory 50 stores data related to astigmatism of the user for each of a plurality of users. The data related to the astigmatism is referred to in a case where the processor 40A executes the adjustment processing, that is, the processing of adjusting the correction amount of the ray angle by the correction lens 32a. That is, the processor 40A adjusts the optical power of each region of the correction lens 32a in accordance with a degree of astigmatism of the user looking at inside the observation unit 30.

The eye of the user having astigmatism has a cornea, a crystalline lens, and the like that are distorted, and is not completely spherical and has an elliptical shape like a rugby ball. Consequently, refraction of light is shifted to cause defocus, and a shape of a subject looks distorted in a case where the subject is viewed.

In astigmatism, the look of the subject has directivity in accordance with a direction in which the cornea, the crystalline lens, and the like are distorted. For example, in a case where the user having astigmatism views an astigmatism table having a radial shape, only lines in a top-to-bottom direction may look dark, and the other lines may look blurry. Alternatively, only lines in a side-to-side direction may look dark, and the other lines may look blurry. Alternatively, only oblique lines may look dark, and the other lines may look blurry.

As described above, the look of the subject has directivity in astigmatism. Thus, the look of the target to be imaged displayed on the display device 31 is different for the user having astigmatism between a case where the imaging apparatus 10A is in the side-to-side placed posture and a case where the imaging apparatus 10A is in the top-to-bottom placed posture. In addition, similarly, the look of the target to be imaged displayed on the display device 31 is different for the user having astigmatism between a case where a direction of the face of the user looking at inside the observation unit 30 is a top-to-bottom direction (a direction in which a head of the user is straight) and a case where the direction of the face of the user is a side-to-side direction (a direction in which the head of the user is inclined).

Accordingly, the data related to the astigmatism that is referred to by the processor 40A in executing the adjustment processing needs to be changed in accordance with the posture of the imaging apparatus 10A and the direction of the face of the user at the point in time. In other words, the data related to the astigmatism that is referred to at a time of executing the adjustment processing needs to be changed in accordance with an inclination of the longitudinal direction of the imaging element 20 with respect to a longitudinal direction of the eye of the user.

Here, the longitudinal direction of the eye of the user is a direction from an inner canthus to an outer canthus. The longitudinal direction of the imaging element 20 is a direction corresponding to a long side direction of the imaging element 20 having a rectangular shape.

Considering the above points, as illustrated in FIG. 4, the internal memory 50 of the present embodiment stores parallel astigmatism data and orthogonal astigmatism data for each user as the data related to the astigmatism of the user. The parallel astigmatism data is the data related to the astigmatism in a case where the longitudinal direction of the imaging element 20 and the longitudinal direction of the eye of the user are parallel or approximately parallel. The orthogonal astigmatism data is the data related to the astigmatism in a case where the longitudinal direction of the imaging element 20 and the longitudinal direction of the eye of the user are orthogonal or approximately orthogonal.

While the parallel astigmatism data and the orthogonal astigmatism data may be separately created, for example, the orthogonal astigmatism data in a state where the parallel astigmatism data is rotated by 90 degrees may be created from the parallel astigmatism data.

The data related to the astigmatism of the user may be prescription slip data related to glasses of the user. For example, the prescription slip data is data indicating a value measured in a case where the user purchases glasses and specifically, indicates cylindrical power (power of astigmatism) of the eye of the user, an astigmatism axis (angle of astigmatism), and the like. The prescription slip data may be stored in the internal memory 50 by manually inputting the cylindrical power, the astigmatism axis, and the like while viewing a prescription slip for glasses obtained from a glasses store or the like by the user. As illustrated in FIG. 5, a measured value of each of spherical power Sph, cylindrical power Cyl, an astigmatism axis AX, a prism, a base, and a pupillary distance PD for the right eye and the left eye of the user is described on the prescription slip for glasses.

Alternatively, the user may transmit the prescription slip data to the imaging apparatus 10A from the external device storing the prescription slip data using a communication function of the communication interface 38 of the imaging apparatus 10A, and the received data may be stored in the internal memory 50.

In a case where the prescription slip data is stored in the internal memory 50 as the data related to the astigmatism of the user, the processor 40A generates adjustment data to be used in the adjustment processing based on the prescription slip data. The adjustment data is data for adjusting the correction amount of the ray angle by the correction lens 32a, that is, adjustment data for the correction amount of the ray angle by the correction lens 32a, in the adjustment processing.

The adjustment data may be stored in the internal memory 50 as the data related to the astigmatism of the user. Hereinafter, a case where the adjustment data is stored in the internal memory 50 as the data related to the astigmatism of the user will be described. In addition, the data related to the astigmatism of the user stored in the internal memory 50 is not particularly limited as long as the degree of astigmatism of the user is perceived from the data.

Furthermore, the data related to the astigmatism of the user is separately stored in the internal memory 50 as data for the left eye and data for the right eye of the user. However, the present invention is not limited thereto. Data corresponding to a single lens of a pair of lenses of the glasses of the user, that is, only the data for the left eye or only the data for the right eye, may be used.

In addition, in a case of preparing a plurality of pieces of the adjustment data for each of the plurality of users, the processor 40A may select and use optimal adjustment data from the plurality of pieces of the adjustment data in accordance with various conditions.

For example, the visual acuity of the user may change depending on whether or not the user is wearing glasses. Thus, adjustment data for a time of wearing glasses and adjustment data for a time of not wearing glasses may be stored in the internal memory 50 as the data related to the astigmatism of the user.

In addition, a size of a pupil of the user may change depending on an imaging environment such as whether the current time point output from the internal clock 37 is in daytime or nighttime or whether extraneous light based on ambient brightness detected by the brightness sensor 36 is bright or dark. Thus, in the internal memory 50, adjustment data for a normal time (daytime) and adjustment data for nighttime may be stored in the internal memory 50 as the data related to the astigmatism of the user.

The memory card 52 is another example of the recording medium and is used by inserting the memory card 52 into a card slot, not illustrated, provided in the imaging apparatus 10A. The memory card 52 is not particularly limited. Examples of the memory card 52 include a secure digital (SD) card.

The image data of the captured image that is a target to be recorded is recorded on the recording medium of at least one of the internal memory 50 of the imaging apparatus 10A or the memory card 52.

[Internal Configuration of Processor]

Next, the processor 40A will be described.

As illustrated in FIG. 2, the processor 40A comprises a control processing unit 42A and an image generation unit 44. The processor 40A functions as the control processing unit 42A and the image generation unit 44 by executing the program stored in the internal memory 50 by the processor 40A.

The control processing unit 42A controls each unit of the imaging apparatus 10A in accordance with an operation of the user performed through the operating unit 24 or with a predetermined control program. In the present embodiment, the control processing unit 42A adjusts the correction amount of the ray angle by the correction lens 32a by controlling the lens adjustment mechanism 39. Specifically, the control processing unit 42A adjusts the optical power of each region of the correction lens 32a in accordance with the degree of astigmatism of the user looking at inside the observation unit 30. Accordingly, in a case where the user looks at inside the observation unit 30 from the eyepiece window 33, the user can view the target to be imaged in a normal state where astigmatism is corrected through the correction lens 32a.

Figure 6:
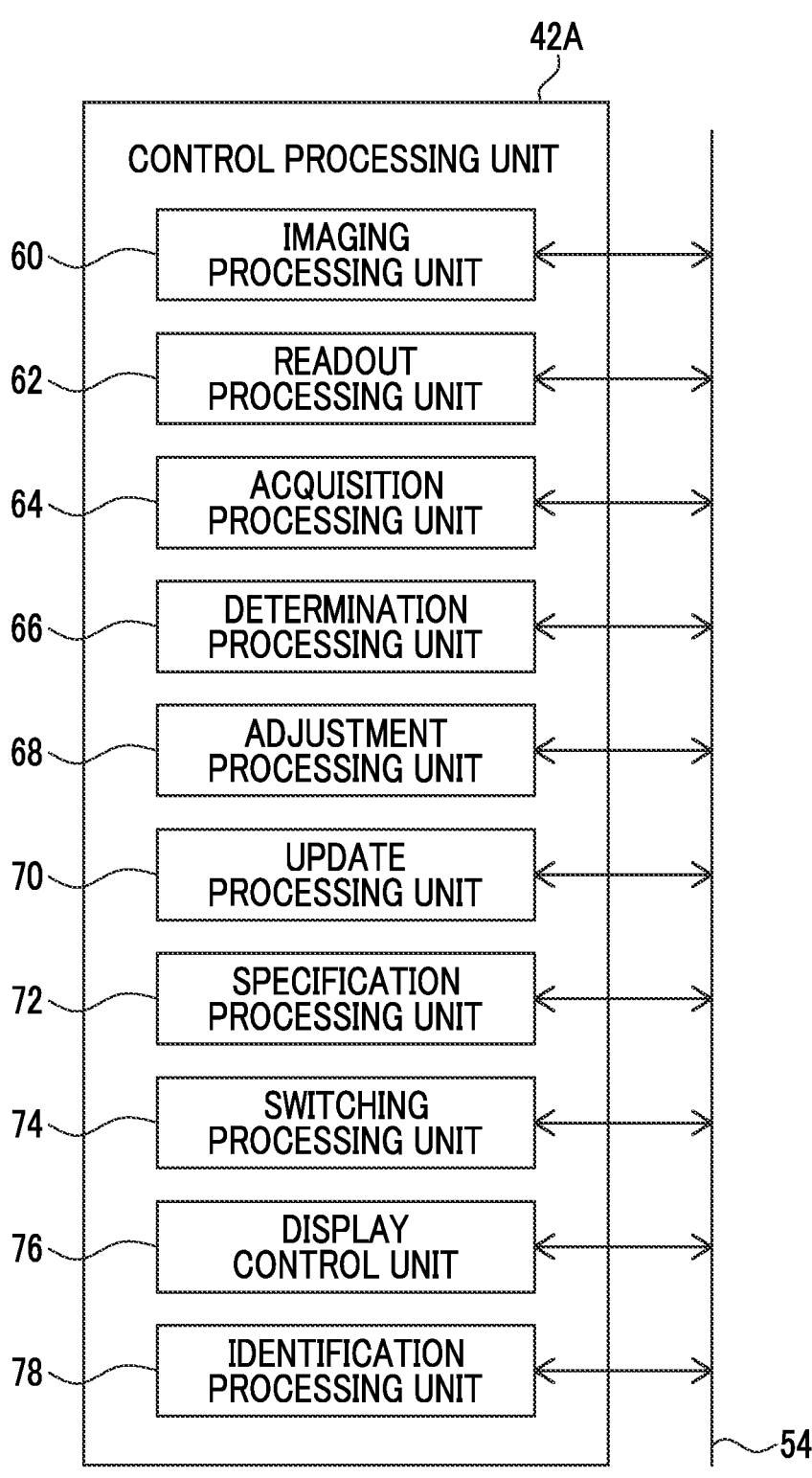
FIG. 6 is a block diagram of an example illustrating a configuration of a control processing unit of the imaging apparatus according to the first embodiment.

As illustrated in FIG. 6, the control processing unit 42A comprises an imaging processing unit 60, a readout processing unit 62, an acquisition processing unit 64, a determination processing unit 66, an adjustment processing unit 68, an update processing unit 70, a specification processing unit 72, a switching processing unit 74, a display control unit 76, and an identification processing unit 78.

The control processing unit 42A can exchange data with the connecting unit 14, the imaging element 20, the rear surface display 22, the operating unit 24, the internal clock 37, the communication interface 38, the internal memory 50, and the memory card 52 through the internal bus 54. In addition, the imaging processing unit 60, the readout processing unit 62, the acquisition processing unit 64, the determination processing unit 66, the adjustment processing unit 68, the update processing unit 70, the specification processing unit 72, the switching processing unit 74, the display control unit 76, and the identification processing unit 78 are also connected to each other through the internal bus 54 and can exchange data with each other.

The imaging processing unit 60 executes imaging processing of imaging the target to be imaged by controlling operations of the stop 16, the shutter 18, the imaging element 20, and the lens drive units 46a and 46b in accordance with the operation of the user.

The readout processing unit 62 executes readout processing of reading out the data related to the astigmatism of the user. In the readout processing, the readout processing unit 62 reads out any of the parallel astigmatism data or the orthogonal astigmatism data. At this point, the data read out by the readout processing unit 62 changes depending on whether the eye of the user looking at inside the observation unit 30 is the left eye or the right eye, whether or not the user is wearing glasses, and the current time point.

The acquisition processing unit 64 executes acquisition processing of acquiring the data output from the sensor 34, such as the data of the distance from the user to the observation unit 30 and the data related to the iris of the user in the present embodiment.

The acquisition processing unit 64 may acquire the data of the distance from the user to the observation unit 30 and the data related to the three-dimensional shape of the face of the user from the sensor 34.

The determination processing unit 66 executes determination processing of determining the inclination of the longitudinal direction of the imaging element 20 with respect to the longitudinal direction of the eye of the user based on the data acquired by the acquisition processing.

The longitudinal direction of the eye of the user corresponds to a first direction of the eye of the user. The longitudinal direction of the imaging element 20 corresponds to a second direction of the imaging element 20. The first direction may be a short direction of the eye of the user, and the second direction may be a short direction of the imaging element 20. The point is that the first direction and the second direction may be any direction as long as a relative inclination relationship between the eye of the user and the imaging element 20 (in other words, the posture of the imaging apparatus 10A) can be specified.

Figure 9A:
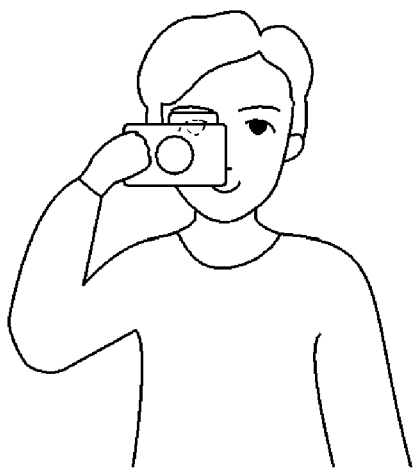
FIG. 9A is a concept diagram of an example illustrating a relationship between a posture of the imaging apparatus and a posture of a user.
Figure 9B:
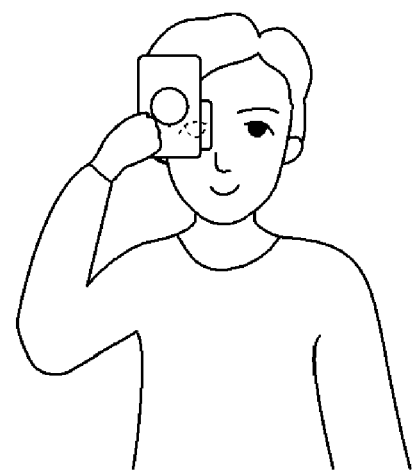
FIG. 9B is a concept diagram of an example illustrating the relationship between the posture of the imaging apparatus and the posture of the user.
Figure 9C:
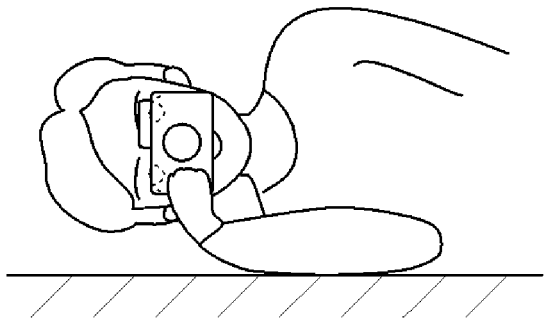
FIG. 9C is a concept diagram of an example illustrating the relationship between the posture of the imaging apparatus and the posture of the user.

The reason for performing the determination processing is that adjustment cannot be accurately performed with only the posture of the imaging apparatus 10A in adjusting optical power of the correction lens 32a so that the target to be imaged is easily viewed by the user having astigmatism in the adjustment processing. For example, as illustrated in FIG. 9C, even in a case where the imaging apparatus 10A is in the top-to-bottom placed posture (that is, the longitudinal direction of the imaging element 20 is along the vertical direction), the user may, for example, lie down, and the longitudinal direction of the eye may be along the vertical direction. In such a situation, only determining whether the posture of the imaging apparatus 10A is side-to-side placed or top-to-bottom placed is not sufficient, and it is important to determine whether the longitudinal direction of the eye of the user and the longitudinal direction of the imaging element 20 are parallel or orthogonal.

The determination processing unit 66 can determine whether the first direction and the second direction are approximately the same directions or approximately orthogonal directions by using, for example, the data related to the iris of the user or the data related to the three-dimensional shape of the face of the user.

The determination processing unit 66 can determine an inclination of the second direction with respect to the first direction by determining, by image analysis or the like, a direction of the eye, a position of the eyelid, and the like in an image including a region of the iris of the user obtained by, for example, iris authentication, based on the data related to the iris of the user acquired by the acquisition processing.

In addition, the determination processing unit 66 can determine the inclination of the second direction with respect to the first direction by determining, by pattern recognition or the like, the direction of the eye, the position of the eyelid, and the like based on the three-dimensional mapping data of the face of the user obtained by, for example, face authentication, based on the data related to the three-dimensional shape of the face of the user acquired by the acquisition processing.

In the present embodiment, as the inclination of the longitudinal direction of the imaging element 20 with respect to the longitudinal direction of the eye of the user, the determination processing unit 66 determines whether both directions are parallel or orthogonal to each other. That is, it is not necessary to determine an angle of the inclination, and for example, whether the longitudinal direction of the eye of the user and the longitudinal direction of the imaging element 20 are the same direction or are shifted by 90 degrees from each other may be determined. In other words, whether a direction of the imaging apparatus 10A is relatively in the side-to-side direction or the top-to-bottom direction with respect to the eye of the user may be determined.

In addition, a button, a changeover switch, or the like for setting whether a direction of the second direction with respect to the first direction, that is, a direction of the imaging element 20 with respect to a direction of the eye of the user, is the side-to-side direction or the top-to-bottom direction may be provided as the operating unit 24. The user may manually set whether the direction of the imaging element 20 with respect to the direction of the eye of the user is the side-to-side direction or the top-to-bottom direction using the button, the changeover switch, or the like. In this case, the determination processing unit 66 can determine the inclination of the second direction with respect to the first direction from a setting state of the button, the changeover switch, or the like.

The adjustment processing unit 68 executes the adjustment processing of adjusting the correction amount of the ray angle by the correction lens 32a based on the data read out by the readout processing and a result of the determination processing.

Specifically, in the determination processing of the determination processing unit 66, in a case where a determination result indicating that the longitudinal direction of the eye of the user and the longitudinal direction of the imaging element 20 are parallel is obtained, the readout processing unit 62 reads out the parallel astigmatism data. In this case, the adjustment processing unit 68 executes the adjustment processing based on the parallel astigmatism data. On the other hand, in a case where a determination result indicating that the longitudinal direction of the eye of the user and the longitudinal direction of the imaging element 20 are orthogonal to each other is obtained, the readout processing unit 62 reads out the orthogonal astigmatism data, and the adjustment processing unit 68 executes the adjustment processing based on the orthogonal astigmatism data.

In a case where the correction amount of the ray angle by the correction lens 32a is manually adjusted by the user after the adjustment processing, the update processing unit 70 executes update processing of updating the adjustment data stored in the internal memory 50 based on the correction amount of the ray angle manually adjusted by the user.

As a description of the manual adjustment of the correction amount of the correction lens 32a by the user, for example, a plurality of sample images (test charts) of which a look changes depending on the degree of astigmatism are displayed on the display device 31. The user looking at inside the observation unit 30 selects an image that looks most clearly from the plurality of sample images. Accordingly, the correction amount of the correction lens 32a can be manually adjusted. The update processing unit 70 updates the adjustment data by replacing the adjustment data stored in the internal memory 50 with the correction amount of the ray angle corresponding to the sample image selected by the user.

As a description of another example of the manual adjustment, a plurality of adjustment modes having different adjustment degrees for the correction amount of the ray angle by the correction lens 32a are selectably displayed. The user looking at inside the observation unit 30 selects a mode in which the target to be imaged looks most clearly from the plurality of adjustment modes. Accordingly, the correction amount of the correction lens 32a can be manually adjusted. The update processing unit 70 updates the adjustment data by replacing the adjustment data stored in the internal memory 50 with the correction amount of the ray angle corresponding to the adjustment mode selected by the user.

As a description of an example of the manual adjustment in a case where the correction lens 32a is the cylindrical lens, a well-known astigmatism table is displayed on the display device 31. The user looking at inside the observation unit 30 performs adjustment to a state where the astigmatism table looks most clearly, by operating an operating dial or the like of the manual lens rotation mechanism included in the operating unit 24 to manually rotate the cylindrical lens that is the correction lens 32a while viewing the displayed astigmatism table. Accordingly, the correction amount of the correction lens 32a can be manually adjusted. The update processing unit 70 updates the adjustment data by replacing the adjustment data stored in the internal memory 50 with the correction amount of the ray angle corresponding to a rotation amount of the correction lens 32a rotated by the user.

As described above, in the present embodiment, the adjustment data stored in the internal memory 50 can be updated to the most recent data by reflecting the manual adjustment performed by the user. Accordingly, the adjustment processing after the update processing is executed using the most recent adjustment data stored in the internal memory 50. Accordingly, the target to be imaged looks more favorably for the user looking at the observation unit 30.

The specification processing unit 72 executes specification processing of obtaining the distance from the user to the observation unit 30 from the data output from the sensor 34 and specifying whether or not the eye of the user is brought close to within a predetermined distance from the eyepiece window 33 based on the obtained distance. Specifically, in a case where the distance is maintained to be less than a reference value for a certain time, the specification processing unit 72 specifies the eye of the user as being brought close to the eyepiece window 33. In a case where the distance is greater than or equal to the reference value, the specification processing unit 72 specifies the eye of the user as being separated from the eyepiece window 33.

Methods other than the above method are also considered as a method of specifying whether or not the eye of the user is brought close to the eyepiece window 33. For example, in a case where the data related to the iris of the user is output from the sensor 34, the size of the iris of the user is calculated from the output data by image analysis or the like. In a case where the size of the iris is less than the reference value, the eye of the user is specified as being separated from the eyepiece window 33. In a case where the size of the iris of the user is greater than or equal to the reference value, the eye of the user is specified as being brought close to the eyepiece window 33.

In addition, in a case where the data related to the three-dimensional shape of the face of the user is output from the sensor 34, the size of the eye of the user is calculated from the output data by pattern recognition or the like. In a case where the size of the eye of the user is less than the reference value, the eye of the user is specified as being separated from the eyepiece window 33. In a case where the size of the eye of the user is greater than or equal to the reference value, the eye of the user is specified as being brought close to the eyepiece window 33.

In addition, the specification processing unit 72 can specify whether or not the user is wearing glasses based on the distance from the user to the observation unit 30 obtained in the specification processing. For example, in a case where the eye of the user is specified as being separated from the eyepiece window 33, the specification processing unit 72 specifies the user as not wearing glasses in a case where the distance is less than the threshold value, and specifies the user as wearing glasses in a case where the distance is greater than or equal to the threshold value.

The switching processing unit 74 executes switching processing of switching whether or not to perform the adjustment processing based on a result of the specification processing.

In the present embodiment, in a case where the user in use is specified as wearing glasses as a result of the specification processing, the switching processing unit 74 switches not to perform the adjustment processing. On the other hand, in a case where the user in use is specified as not wearing glasses, the switching processing unit 74 switches to perform the adjustment processing.

The display control unit 76 executes display processing of displaying the live view image and the like on the rear surface display 22 or the display device 31. In the present embodiment, the display control unit 76 switches a display location of the live view image during imaging based on the result of the specification processing. For example, in a case where the eye of the user is specified as being separated from the eyepiece window 33 in the specification processing, the display control unit 76 executes the display processing of displaying the live view image on the rear surface display 22. On the other hand, in a case where the eye of the user is specified as being brought close to the eyepiece window 33 in the specification processing, the display control unit 76 executes the display processing of displaying the live view image on the display device 31.

In addition, executing the adjustment processing means that the correction amount of the ray angle by the correction lens 32a is being adjusted. In a case where the live view image is viewed through the correction lens 32a during the execution of the adjustment processing, there is a possibility that the live view image does not look clearly. In order to solve such a problem, the display control unit 76 does not display the live view image on the display device 31 during the execution of the adjustment processing. After the adjustment processing is completed, the display control unit 76 executes the display processing of displaying the live view image on the display device 31.

The identification processing unit 78 executes identification processing of identifying the user (hereinafter, referred to as the user in use) who is using the imaging apparatus 10A. A method of identifying the user in use is not particularly limited. For example, in a case where the sensor 34 outputs the data related to the iris of the user, the user in use can be identified by iris authentication or the like in the identification processing. Besides, the user in use can be identified using well-known biometric authentication such as fingerprint authentication, face authentication, and voice (voiceprint) authentication.

An identification result of the identification processing is reflected on the readout processing performed by the readout processing unit 62. That is, in a case where the user in use is identified in the identification processing, the readout processing unit 62 executes the readout processing of reading out the adjustment data corresponding to the user in use from the adjustment data (data related to the astigmatism of the user) of the plurality of users stored in the internal memory 50.

The image generation unit 44 generates the live view image and the captured image based on the imaging signal read out from the imaging element 20.

Figure 8:
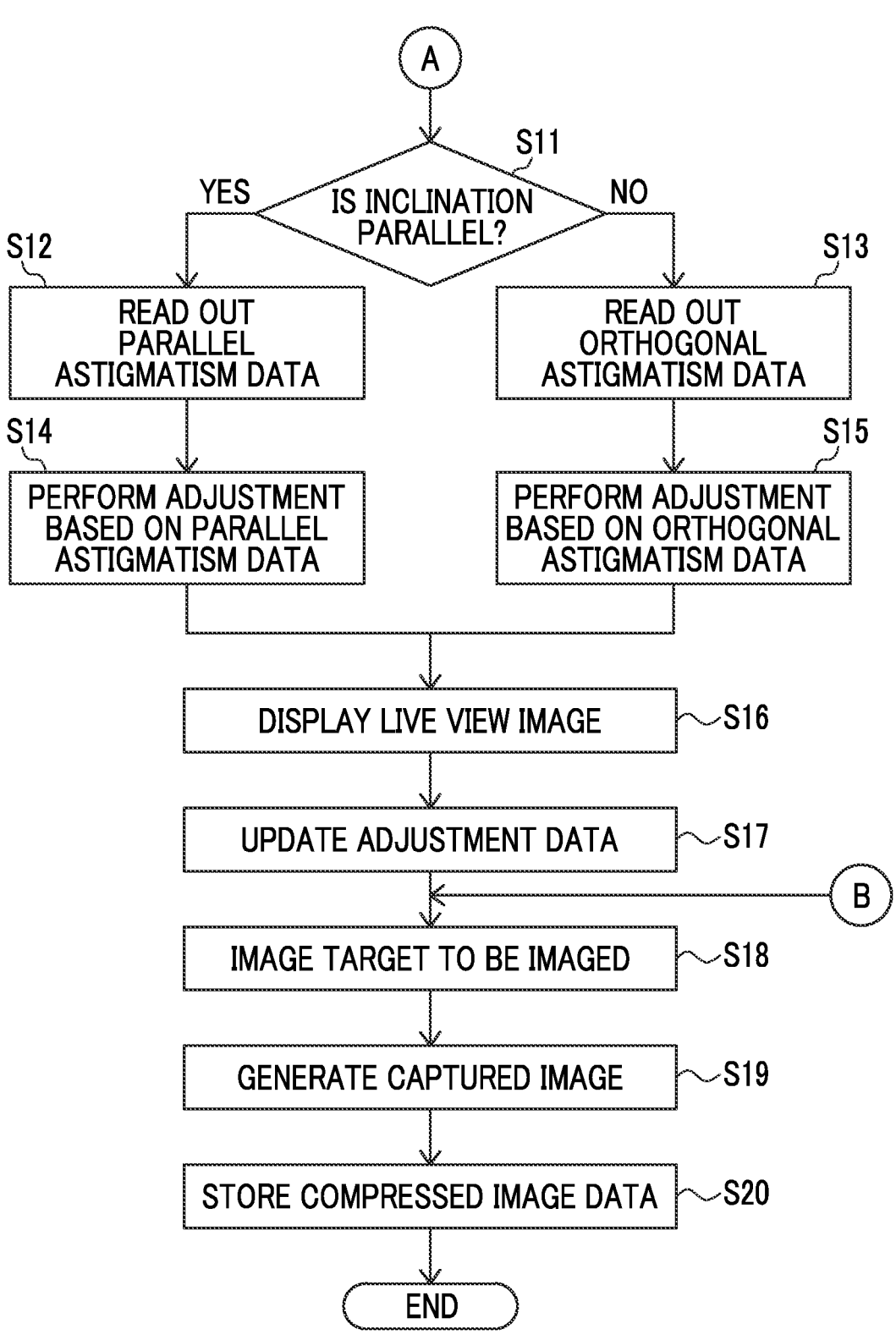
FIG. 8 is a flowchart continuing from FIG. 7 illustrating the operation of the imaging apparatus according to the first embodiment.

Next, an operation of the imaging apparatus 10A in a case of imaging the target to be imaged will be described with reference to the flowcharts illustrated in FIG. 7 and FIG. 8.

In a step before the imaging apparatus 10A starts operating, an assumption that the internal memory 50 stores the adjustment data including the parallel astigmatism data and the orthogonal astigmatism data for each of the plurality of users as the data related to the astigmatism of the user is made.

In a case where the imaging apparatus 10A is started by the user (user in use), first, the identification processing unit 78 executes the identification processing (step S1). The user in use is identified by the identification processing. Specifically, whether or not the user in use is a user registered in advance is determined.

As a result of the identification processing, in a case where the user in use is identified as not being the user registered in advance (NO in step S1), the imaging apparatus 10A cannot be used. Thus, the processing is finished.

On the other hand, in a case where the user in use is identified as being the user registered in advance (YES in step S1), a transition is made to step S2.

In a case where the user in use is identified, the imaging element 20 images the target to be imaged during imaging, and the imaging signal is output from the imaging element 20. Accordingly, generation processing of generating the live view image based on the imaging signal output from the imaging element 20 is executed by the image generation unit 44 (step S2).

Next, in a case where the user in use looks at inside the observation unit 30 from the eyepiece window 33, the acquisition processing of acquiring the data output from the sensor 34 is executed by the acquisition processing unit 64 (step S3). As described above, the data output from the sensor 34 is the data of the distance from the user to the observation unit 30 and the data related to the iris of the user in use or the data related to the three-dimensional shape of the face of the user in use.

Next, the specification processing of specifying whether or not the eye of the user is brought close to the eyepiece window 33 based on the data acquired in the acquisition processing is executed by the specification processing unit 72 (step S4). In the specification processing, the distance from the user in use to the observation unit 30 is calculated from the data acquired in the acquisition processing, and in a case where the calculated distance is less than the reference value for a certain time, the eye of the user in use is specified as being brought close to the eyepiece window 33. On the other hand, in a case where the calculated distance is greater than or equal to the reference value, the eye of the user is specified as being separated from the eyepiece window 33.

As a result of the specification processing in step S4, in a case where the eye of the user in use is specified as being separated from the eyepiece window 33 (NO in step S4), the display processing of displaying the live view image on the rear surface display 22 is executed by the display control unit 76 (step S5).

On the other hand, in a case where the eye of the user in use is specified as being brought close to the eyepiece window 33 (YES in step S4), the display processing of displaying the live view image on the display device 31 of the observation unit 30 is executed by the display control unit 76 (step S6).

Accordingly, during imaging, the live view image is displayed on the rear surface display 22 or on the display device 31 of the observation unit 30. That is, during imaging, the user can view the live view image and the like displayed on the rear surface display 22 or, in a case where the user looks at inside the observation unit 30 from the eyepiece window 33 provided on the rear surface of the imaging apparatus 10A, can view the live view image and the like displayed on the display device 31 through the observation optical system 32.

For example, a display switch for switching display/non-display of the live view image may be provided as the operating unit 24, and the display location of the live view image may be switched between the rear surface display 22 and the display device 31 at a timing at which the user operates the display switch.

Next, the specification processing of specifying whether or not the user in use is wearing glasses based on the data of the distance acquired by the acquisition processing is executed by the specification processing unit 72 (step S7).

As a result of the specification processing in step S7, in a case where the user in use is specified as wearing glasses (YES in step S7), astigmatism of the user in use has already been corrected by glasses. Thus, the switching processing of switching not to perform the adjustment processing is executed by the switching processing unit 74 (step S8). Then, a transition is made to step S18.

On the other hand, in a case where the user in use is specified as not wearing glasses (NO in step S7), astigmatism of the user in use is not corrected by glasses. Thus, the switching processing of switching to perform the adjustment processing is executed by the switching processing unit 74 (step S9). Then, a transition is made to step S10.

During the execution of the adjustment processing, processing of controlling the live view image not to be displayed on the display device 31 is executed by the display control unit 76 (step S10).

During the execution of the adjustment processing, the correction amount of the ray angle of the correction lens changes. Accordingly, by controlling the live view image not to be displayed on the display device 31 during this period, it is possible to prevent the user from viewing the live view image displayed on the display device 31 in a state where astigmatism is not corrected. During the execution of the adjustment processing, an image of which the entire surface is black (single color) or the like may be displayed, or a message representing that adjustment is being performed may be displayed.

Next, the determination processing of determining whether or not the inclination of the longitudinal direction (second direction) of the imaging element 20 with respect to the longitudinal direction (first direction) of the eye of the user in use is executed by the determination processing unit 66 (step S11). In the determination processing, whether or not the two directions are parallel or orthogonal to each other is determined. For example, as illustrated in FIG. 9A, in a case where the imaging apparatus 10A is in the side-to-side placed posture, and the direction of the face of the user in use is the top-to-bottom direction, a determination that the two directions are parallel is made. In addition, as illustrated in FIG. 9B, in a case where the imaging apparatus 10A is in the top-to-bottom placed posture, and the direction of the face of the user in use is the top-to-bottom direction, a determination that the two directions are orthogonal is made. As illustrated in FIG. 9C, in a case where the imaging apparatus 10A is in the top-to-bottom placed posture, and the user in use is lying down, a determination that the two directions are parallel is made.

Next, the readout processing of reading out the adjustment data associated with the user in use from the internal memory 50 as the data related to the astigmatism of the user in use identified by the identification processing is executed by the readout processing unit 62. The adjustment data read out in the readout processing changes depending on a specification result in the specification processing and the determination result in the determination processing.

Specifically, in a case where a determination that the longitudinal direction of the eye of the user in use and the longitudinal direction of the imaging element 20 are parallel is made in the determination processing (YES in step S11), the readout processing of reading out the parallel astigmatism data of the user in use is executed by the readout processing unit 62 (step S12). On the other hand, in a case where a determination that the longitudinal direction of the eye of the user in use and the longitudinal direction of the imaging element 20 are orthogonal is made in the determination processing (NO in step S11), the readout processing of reading out the orthogonal astigmatism data of the user in use is executed by the readout processing unit 62 (step S13).

The adjustment data to be read out may be changed depending on whether or not the user is wearing glasses, whether the current time point is in daytime or nighttime, and whether the extraneous light is bright or dark.

Next, the adjustment processing of adjusting the correction amount of the ray angle by the correction lens 32a based on the adjustment data of the user in use read out in the readout processing is executed by the adjustment processing unit 68. In a case where the parallel astigmatism data is read out in the readout processing, the adjustment processing is executed based on the parallel astigmatism data (step S14). On the other hand, in a case where the orthogonal astigmatism data is read out, the adjustment processing is executed based on the orthogonal astigmatism data (step S15).

By performing the adjustment processing based on the data related to the astigmatism of the user in use, the correction amount by the correction lens 32a is adjusted in accordance with the degree of astigmatism of the user in use. Consequently, even in a case where the user in use has astigmatism, the user in use can favorably view the live view image and the like displayed on the display device 31 through the correction lens 32a. In addition, the data (adjustment data) related to the astigmatism used in the adjustment processing is changed in accordance with a relative inclination of the imaging apparatus 10A with respect to the eye of the user in use. Accordingly, since the adjustment processing can be executed in accordance with the direction of the eye of the user in use and the posture of the imaging apparatus 10A at the point in time, the correction amount by the correction lens 32a can be adjusted more appropriately than in a case of executing the adjustment processing by considering only the posture of the imaging apparatus.

In the present embodiment, the plurality of pieces of the adjustment data are prepared for each of the plurality of users, and optimal adjustment data can be selected and used from the plurality of pieces of the adjustment data in accordance with various conditions.

For example, the adjustment processing can be more appropriately executed by differentiating the use of the adjustment data depending on whether or not glasses are worn.

In addition, the adjustment processing can be more appropriately executed by differentiating the use of the adjustment data depending on the imaging environment such as whether the current time point is in daytime or nighttime or whether the extraneous light is bright or dark.

After the adjustment processing is finished, the display processing of controlling the live view image to be displayed on the display device 31 is executed by the display control unit 76 (step S16).

In a case where the correction amount of the ray angle by the correction lens 32a is manually adjusted by the user in use after the adjustment processing, the update processing of updating the adjustment data stored in the internal memory 50 based on the correction amount of the ray angle manually adjusted by the user in use is executed by the update processing unit 70 (step S17).

Next, in a case where the user pushes the release button 24a, the imaging processing of imaging the target to be imaged is executed by the imaging processing unit 60 (step S18).

In a case where the target to be imaged is imaged, the generation processing of generating the captured image based on the imaging signal read out from the imaging element 20 is executed by the image generation unit (step S19).

Next, for example, the imaging processing unit 60 compresses the captured image generated by the generation processing and stores the compressed image data in the memory card 52, and the processing is finished (step S20).

The imaging processing unit 60 may store the image data of the captured image in the internal memory 50 or the memory card 52 without compressing the captured image.

Configuration Example of Imaging Apparatus
According to Second Embodiment

Next, an imaging apparatus according to a second embodiment of the present invention will be described.

As illustrated in FIG. 1 and FIG. 2, an imaging apparatus 10B of the second embodiment comprises a processor 40B and a control processing unit 42B. Differences between the imaging apparatus 10A of the first embodiment and the imaging apparatus 10B of the second embodiment are the internal memory 50, the processor 40B, the control processing unit 42B, and the like. Description of the other same constituents will not be repeated.

The observation unit 30 of the second embodiment has a configuration in which even a user having presbyopia can favorably view the target to be imaged. Even in the second embodiment, the observation unit 30 is an EVF but may be an OVF or a hybrid type finder. In a case where the observation unit 30 consists of an EVF, a distance to the target to be imaged (strictly, the target to be imaged displayed on the display device 31) is constant. Thus, the correction amount does not need to be frequently adjusted, and this is more advantageous for the user having presbyopia for which a range of a focused distance is narrow.

In addition, in the second embodiment, while a liquid crystal lens is used as the correction lens 32a, the present invention is not limited thereto, and other variable focus lenses may also be used. For example, a liquid lens may also be used.

Presbyopia is a symptom of having difficulty in viewing a nearby object in accordance with aging. A crystalline lens of an eye has a role of a lens that focuses on the subject. In a case of viewing a distant object, a thickness of the crystalline lens is decreased by a movement of a muscle performing focus adjustment, and the distant object is focused. On the other hand, in a case of viewing a nearby object, the thickness of the crystalline lens is increased, and the nearby object is focused.

However, the crystalline lens becomes rigid in accordance with aging, and strength of the muscle performing focus adjustment is weakened. Thus, gradually the thickness of the crystalline lens cannot be increased, and the nearby object cannot be focused.

Figure 10:
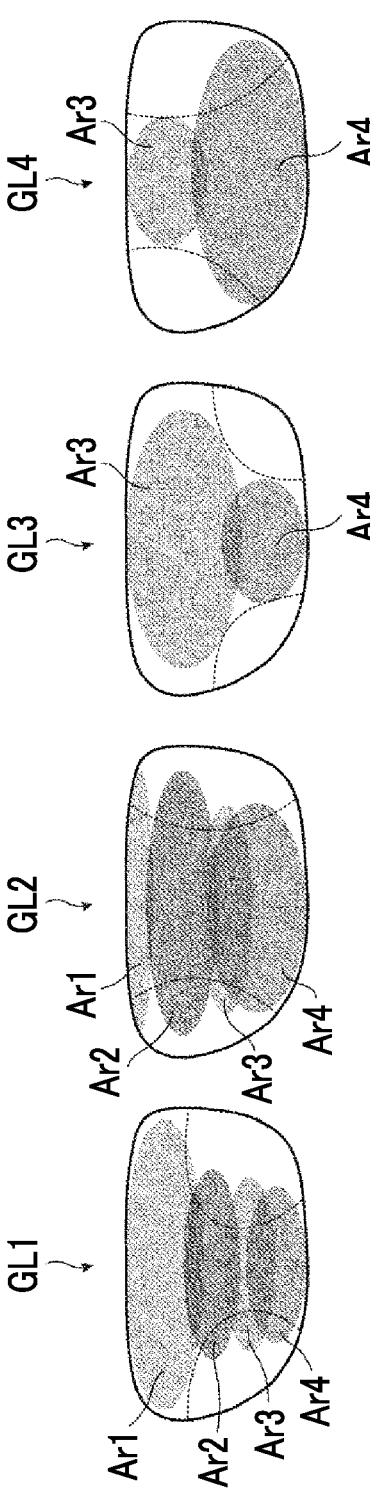
FIG. 10 is a concept diagram of an example illustrating a configuration of a lens of presbyopia glasses.

Normally, a plurality of lenses are used in presbyopia glasses in accordance with the use thereof. Specifically, a bifocal lens GL1, an intermediate and near vision lens GL2, a progressive addition lens GL3, a close vision lens GL4, and the like are used. Each of these lenses is divided into a plurality of regions having different optical power as illustrated in FIG. 10. For example, the bifocal lens GL1 and the intermediate and near vision lens GL2 are divided into four regions of a distant region Ar1, an intermediate region Ar2, a near region Ar3, and a close region Ar4 from an upper side toward a lower side of the lens. The distant region Ar1 is a region for viewing a distant object. The intermediate region Ar2 is a region for viewing an object at an intermediate distance. The near region Ar3 is a region for viewing a nearby object. The close region Ar4 is a region for viewing a close object. The progressive addition lens GL3 and the close vision lens GL4 are divided into two regions of the near region Ar3 and the close region Ar4 from the upper side toward the lower side of the lens.

As described above, the lens of the presbyopia glasses is divided into the plurality of regions in an up-down direction of the lens. In addition, the number of regions into which the lens of the presbyopia glasses is divided, a size of each region, arrangement positions and an optical characteristic in the lens, and the like also vary. Considering these points, the correction amount of the ray angle by the correction lens 32a is adjusted for each region of the correction lens 32a based on data corresponding to the optical characteristic of each region of the lens of the presbyopia glasses in the second embodiment. Accordingly, even the user having presbyopia can favorably view the target to be imaged in a case of looking at the observation unit 30 without wearing the presbyopia glasses.

The above configuration will be described in detail below.

In the second embodiment, the internal memory 50 stores the data, illustrated in FIG. 11, corresponding to the optical characteristic of each region of the lens of the glasses (presbyopia glasses) used by the user for each of the plurality of users as data related to presbyopia of the user.

As the data corresponding to the optical characteristic of each region of the lens of the glasses used by the user, for example, data indicating distant and near power, and the like of the eye of the user, that is, the prescription slip data corresponding to the glasses of the user, can be used. The processor 40B generates the adjustment data to be used in the adjustment processing based on the prescription slip data. In the second embodiment, the adjustment data is data for adjusting the correction amount of the ray angle by the correction lens 32a for each region of the correction lens 32a corresponding to the regions of the lens of the glasses used by the user. That is, the adjustment data in the second embodiment is adjustment data corresponding to the optical characteristic of each region of the lens of the glasses used by the user. Hereinafter, the adjustment data will be referred to as adjustment data of each region.

The adjustment data may be stored in the internal memory 50 as the data corresponding to the optical characteristic of each region of the lens of the glasses used by the user. Hereinafter, a case where the adjustment data is stored in the internal memory 50 will be described.

The internal memory 50 may store any data as the data related to the presbyopia of the user as long as a degree of presbyopia of the user is perceived from the data for each region of the glasses of the user. The prescription slip data may be stored in the internal memory 50 by manually inputting information and the like related to presbyopia while viewing the prescription slip for glasses obtained from the glasses store or the like by the user.

Alternatively, the processor 40B may transmit the prescription slip data to the imaging apparatus 10B from the external device storing the prescription slip data using the communication function of the communication interface 38 of the imaging apparatus 10B and store the received data in the internal memory 50. In addition, the data related to the presbyopia of the user may be only the adjustment data of a single lens of the glasses of the user or data of power of a single eye in the prescription slip for the glasses of the user.

Figure 12:
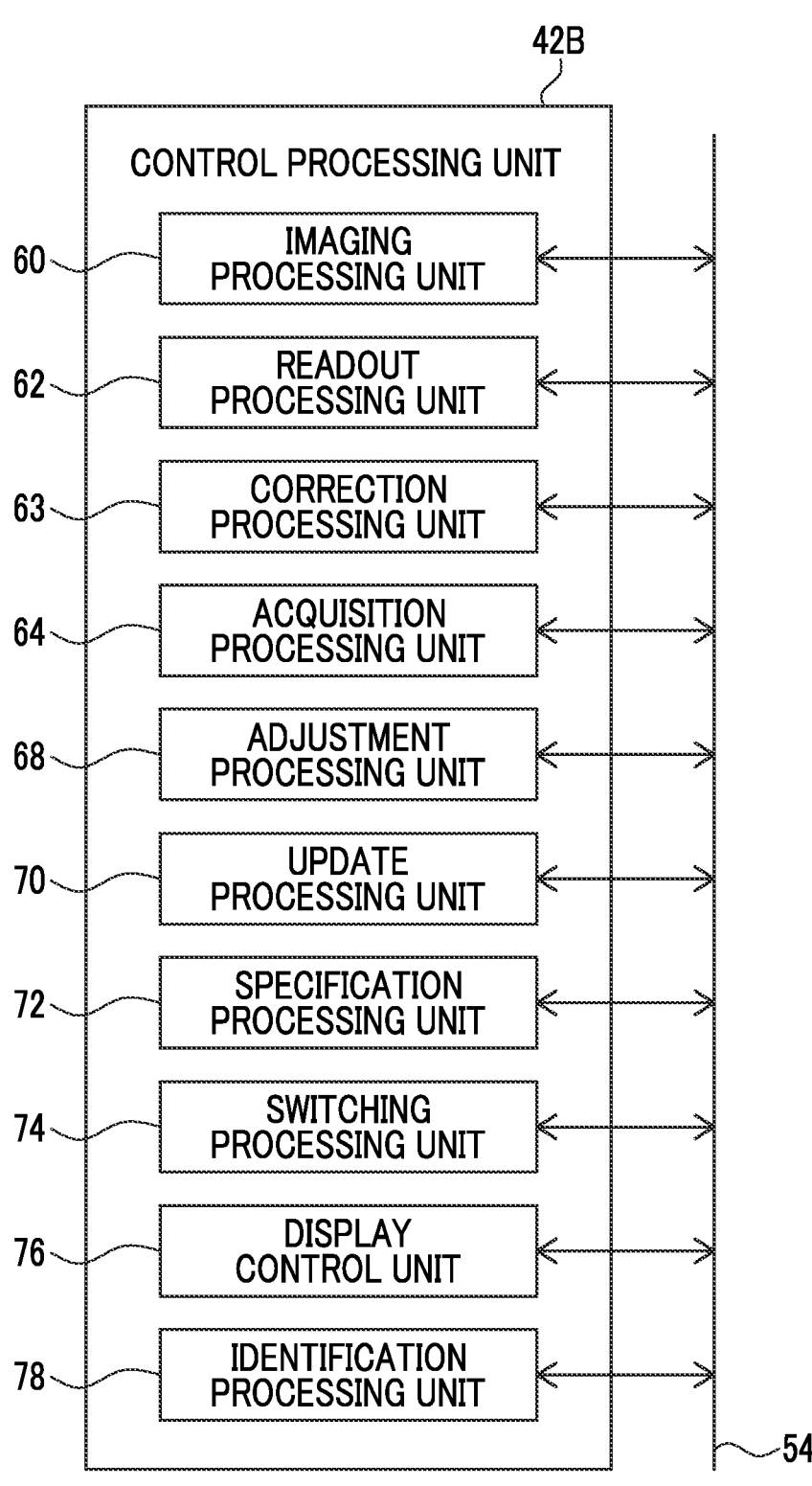
FIG. 12 is a block diagram of an example illustrating a configuration of a control processing unit of an imaging apparatus according to a second embodiment.

In the second embodiment, even in a case where the user having presbyopia looks at inside the observation unit 30 without wearing the presbyopia glasses, the control processing unit 42B controls the lens adjustment mechanism to adjust the optical power of each region of the correction lens 32a so that the target to be imaged can be favorably viewed. As illustrated in FIG. 12, the control processing unit 42B according to the second embodiment comprises the imaging processing unit 60, the readout processing unit 62, a correction processing unit 63, the acquisition processing unit 64, the adjustment processing unit 68, the update processing unit 70, the specification processing unit 72, the switching processing unit 74, the display control unit 76, and the identification processing unit 78.

As in the first embodiment, the control processing unit 42B can exchange data with the connecting unit 14, the imaging element 20, the rear surface display 22, the operating unit 24, the internal clock 37, the communication interface 38, the internal memory 50, and the memory card 52 through the internal bus 54. In addition, the imaging processing unit 60, the readout processing unit 62, the correction processing unit 63, the acquisition processing unit 64, the adjustment processing unit 68, the update processing unit 70, the specification processing unit 72, the switching processing unit 74, the display control unit 76, and the identification processing unit 78 of the control processing unit 42B are also connected to each other through the internal bus 54 and can exchange data with each other.

Differences between the control processing unit 42A of the first embodiment and the control processing unit 42B of the second embodiment are the readout processing unit 62, the correction processing unit 63, the adjustment processing unit 68, the update processing unit 70, and the like. Description of the other same constituents will not be repeated.

In the second embodiment, the readout processing unit 62 executes the readout processing of reading out the adjustment data of each region from the internal memory 50 as the data related to the presbyopia of the user.

The correction processing unit 63 executes correction processing of correcting the image displayed on the display device 31 based on the adjustment data of each region read out by the readout processing.

The correction processing is not particularly limited. Examples of the correction processing include image correction such as contour highlighting and distortion correction. Such image correction is correction for canceling out distortion caused by the presbyopia glasses. For example, an end part region surrounded by a broken line in each lens in FIG. 10 is a region in which distortion occurs. That is, the image correction is correction of the image such that the image displayed on the display device 31 in a case where the user wearing the presbyopia glasses looks at the observation unit 30 is clearly viewed even in the end part region of each lens. For example, the correction processing unit 63 displays a plurality of sample images such as test charts in which a distortion degree and a contour highlighting degree of the image are different between the end part region and a center region of the image, on the display device 31. In a case where the user selects an image having the least distortion and the highest visibility, the image correction corresponding to the sample image selected by the user may be performed. In addition, the correction processing unit 63 may correct the entire image displayed on the display device 31 in the same manner or may perform the image correction for each region corresponding to the regions of the lens of the glasses of the user.

The image displayed on the display device 31 may be automatically corrected by the correction processing. Alternatively, the user may manually correct the image displayed on the display device 31. Alternatively, the user may manually correct the image displayed on the display device 31 after the image displayed on the display device 31 is automatically corrected.

The adjustment processing unit 68 executes the adjustment processing of adjusting the correction amount of the ray angle by the correction lens 32a for each region of the correction lens 32a based on the adjustment data of each region read out by the readout processing.

The update processing unit 70 executes the update processing in a case where the correction amount of the ray angle by the correction lens 32a is manually adjusted for each region of the correction lens 32a by the user after the adjustment processing. In the update processing, the adjustment data of each region stored in the internal memory 50 is updated based on the correction amount of the ray angle of each region manually adjusted by the user.

As described above, the adjustment data of each region stored in the internal memory 50 can be updated to the most recent data by reflecting the adjustment performed by the user. Accordingly, since the adjustment processing after the update processing is executed using the most recent data stored in the internal memory 50, the user having presbyopia can favorably view the target to be imaged at all times.

In the second embodiment, after the correction amount of the ray angle by the correction lens (a liquid crystal lens or a liquid lens) 32a is automatically adjusted, the user may manually adjust the correction amount of the ray angle by the correction lens 32a.

Figure 14:
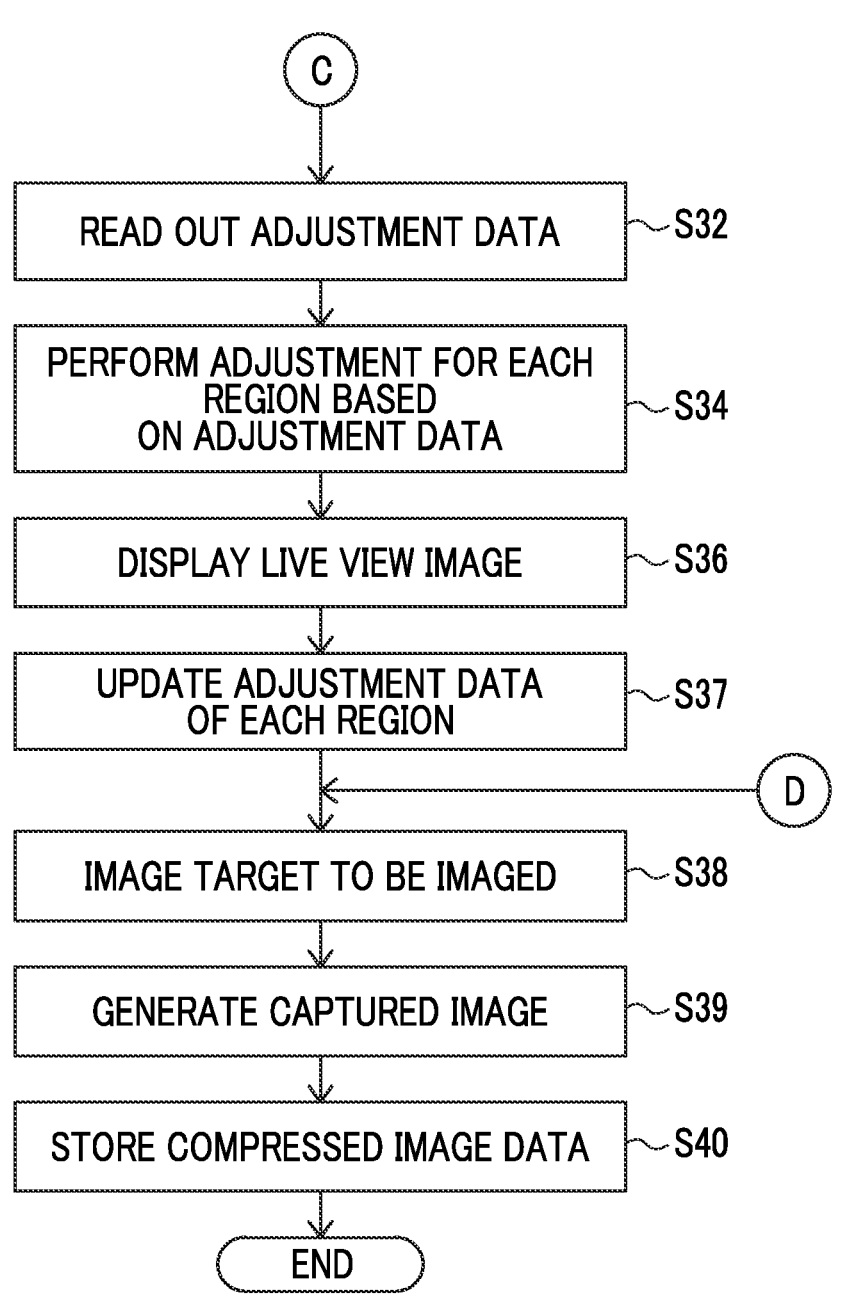
FIG. 14 is a flowchart continuing from FIG. 13 illustrating the operation of the imaging apparatus according to the second embodiment.

Next, an operation of the imaging apparatus 10B in a case of imaging the target to be imaged will be described with reference to the flowcharts illustrated in FIG. 13 and FIG. 14.

An assumption that the internal memory 50 stores the adjustment data (first adjustment data) of each region for the plurality of users as the data related to the presbyopia of the user is made.

First, an operation from step S21 to step S30 is the same as the operation from step S1 to step S10 of the first embodiment except that the user in use has presbyopia.

Next, the readout processing of reading out the adjustment data of each region from the internal memory 50 as the data related to the presbyopia of the user in use identified by the identification processing is executed by the readout processing unit 62 (step S32).

Next, the adjustment processing of adjusting the correction amount of the ray angle by the correction lens 32a for each region of the correction lens 32a based on the adjustment data of each region read out in the readout processing is executed by the adjustment processing unit 68 (step S34).

Here, as described above, the lens of the glasses (presbyopia glasses) worn by the user in use is divided into the plurality of regions in the up-down direction thereof. Each of the plurality of regions in the correction lens 32a is associated with at least one of the plurality of regions in the lens of the glasses of the user in use. For example, each of the plurality of regions in the correction lens 32a is associated one-on-one with each of the plurality of regions in the lens of the glasses of the user.

In the second embodiment, in adjusting the correction amount of the ray angle for the regions of the correction lens 32a based on the adjustment data of each region, the adjustment processing unit 68 performs adjustment in accordance with the adjustment data corresponding to the optical characteristic of the associated region among the plurality of regions in the lens of the glasses of the user in use.

In the second embodiment, by performing the adjustment processing based on the data related to the presbyopia of the user, the user in use having presbyopia can favorably view the image (live view image and the like) displayed on the display device 31 without wearing the presbyopia glasses. As in the first embodiment, in order not to show the live view image in the middle of correction to the user in use during the execution of the adjustment processing, it is preferable not to display the live view image on the display device 31.

After the adjustment processing is finished, the display processing of controlling the live view image to be displayed on the display device 31 is executed by the display control unit 76 (step S36).

The update processing is executed by the update processing unit 70 in a case where the correction amount of the ray angle by the correction lens 32a is manually adjusted for each region of the correction lens 32a by the user after the adjustment processing (step S37). In the update processing, the adjustment data of each region stored in the internal memory 50 is updated based on the correction amount of the ray angle of each region of the correction lens 32a manually adjusted by the user in use.

A subsequent operation from step S38 to step S40 is the same as the operation from step S18 to step S20 of the first embodiment.

The correction processing unit 63 may execute the correction processing of performing the image correction such as distortion correction and contour highlighting on the image displayed on the display device 31 based on the data read out by the readout processing. By executing the correction processing, the user in use having presbyopia can more favorably view the live view image and the like displayed on the display device 31. In this case, the display processing (second display processing) of controlling the image during the execution of the adjustment processing not to be displayed on the display device 31 may be executed in step S30 by the display control unit 76.

The processor 40B may switch whether to perform only the adjustment processing, perform only the correction processing, or perform both of the adjustment processing and the correction processing in accordance with an instruction from the user in use through the operating unit 24.

The processor 40B may store a plurality of pieces of the adjustment data in the internal memory 50 for a certain user in use.

For example, the processor 40B may switch the adjustment data to be used depending on the imaging environment such as whether the current time point output from the internal clock 37 is in daytime or nighttime or whether the extraneous light based on the ambient brightness detected by the brightness sensor 36 is bright or dark. A focus adjustment function of a crystalline lens of an eye of a person tends to be decreased after evening in a case where the eye has been used during the day. In other words, it is preferable that the adjustment processing unit 68 reads out different adjustment data from the internal memory 50 in accordance with a degraded degree of presbyopia.

Furthermore, the adjustment processing unit 68 may select correction data based on an operating time of the imaging apparatus 10A of the user measured on the present day from the current time point output from the internal clock 37, or on the operating time of the external device of the user received from the external device by the communication interface 38. Depending on whether these operating times are less than a reference value or greater than or equal to the reference value, a degree of eye strain of the user changes, and the focus adjustment function of the crystalline lens changes. Thus, the adjustment processing unit 68 may read out the adjustment data for long-time work from the internal memory 50 as the data related to the presbyopia of the user.

Configuration Example of Imaging Apparatus According to Third Embodiment

Next, an imaging apparatus 10C according to a third embodiment of the present invention will be described.

As illustrated in FIG. 1 and FIG. 2, the imaging apparatus 10C of the third embodiment comprises a processor 40C and a control processing unit 42C. Differences between the imaging apparatus 10A of the first embodiment and the imaging apparatus 10C of the third embodiment are the processor 40C, the control processing unit 42C, and the like. Description of the other same constituents will not be repeated.

As illustrated in FIG. 18, the imaging apparatus 10C of the third embodiment comprises a first observation unit 30A incorporated in the imaging apparatus 10C. Furthermore, a second observation unit 30B of an external type can be connected using the connecting unit 14.

The first observation unit 30A and the second observation unit 30B have approximately the same structures as the observation unit 30 of the first embodiment and are devices at which the user looks in order to observe the target to be imaged of the imaging element 20. Each of the first observation unit 30A and the second observation unit 30B includes the observation optical system 32. The observation optical system 32 of the first observation unit 30A includes the first correction lens 32a for correcting the ray angle incident on the eye of the user. The observation optical system 32 of the second observation unit 30B includes a second correction lens, not illustrated, for correcting the ray angle incident on the eye of the user.

Even in a case where the users having astigmatism and presbyopia look at inside the second observation unit 30B of the external type by connecting the second observation unit 30B of the external type to the imaging apparatus 10C in addition to the first observation unit 30A incorporated in the imaging apparatus 10C, the same problem arises in that it is difficult to view the target to be imaged.

The first observation unit 30A and the second observation unit 30B are EVFs but may be OVFs or hybrid type finders. In addition, in the third embodiment, while liquid crystal lenses are used as the first correction lens 32a and the second correction lens, the present invention is not limited thereto, and liquid lenses, cylindrical lenses, and the like may also be used.

The connecting unit 14 connects the second observation unit 30B to the imaging apparatus 10C.

The connecting unit 14 is a hot shoe that physically and electrically connects the second observation unit 30B to the imaging apparatus 10C. However, the present invention is not limited thereto. The connecting unit 14 may be composed of a wireless connecting circuit that logically connects the second observation unit 30B to the imaging apparatus 10C wirelessly. Examples of the second observation unit 30B include an observation unit such as a head mounted display (HMD) worn by the user.

In a case where the second observation unit 30B and the imaging apparatus 10C are connected through the connecting unit 14, data can be transmitted and received between the second observation unit 30B and the imaging apparatus 10C. In the present embodiment, information (hereinafter, referred to as adjustment availability information) and the like about whether or not the correction amount of the ray angle by the second correction lens of the second observation unit 30B can be adjusted are transmitted to the imaging apparatus 10C from the second observation unit 30B. The adjustment availability information is stored in an observation unit-side memory, not illustrated, provided on a second observation unit 30B side.

In addition, in a case where the correction amount of the ray angle by the second correction lens of the second observation unit 30B can be adjusted, a control signal and the like for adjusting the correction amount of the ray angle by the second correction lens are transmitted to a lens adjustment mechanism (not illustrated) inside the second observation unit 30B from the imaging apparatus 10C.

In the present embodiment, the processor 40C is configured to execute the adjustment processing that targets a lens with which the correction amount of the ray angle can be adjusted, out of the first correction lens 32a of the first observation unit 30A and the second correction lens of the second observation unit 30B. Specifically, in a case where a correction lens of an observation unit at which the user is looking is an adjustable lens, the processor 40C executes the adjustment processing that targets the correction lens.

In the third embodiment, the internal memory 50 stores data (hereinafter, first vision data) related to vision of the user for each of the plurality of users as data for adjusting the correction amount of the ray angle by the first correction lens 32a. In addition, a memory of the second observation unit 30B comprising the adjustable second correction lens stores data (hereinafter, second vision data) related to vision of the user for the plurality of users as data for adjusting the correction amount of the ray angle by the second correction lens. The second vision data may be stored in the internal memory 50 of the imaging apparatus 10C in the same manner as the first vision data.

The first vision data and the second vision data are not particularly limited but may be, for example, the data related to the astigmatism of the user in the first embodiment or the data related to the presbyopia of the user in the second embodiment or may include both of the data. In addition, any data may be stored as the first vision data and the second vision data as long as the data is related to the eye of the user. Furthermore, the first vision data and the second vision data may be only data (for example, data of power of a single eye) related to a single lens of the glasses of the user.

In addition, the first vision data and the second vision data may be stored in the internal memory 50 or the like by manually inputting information and the like related to the eye of the user while viewing the prescription slip for glasses obtained from the glasses store or the like by the user. Alternatively, the processor 40C may transmit the prescription slip data to the imaging apparatus 10C from the external device storing the prescription slip data using the communication function of the communication interface 38 of the imaging apparatus 10C and store the received data in the internal memory 50.

Figure 15:
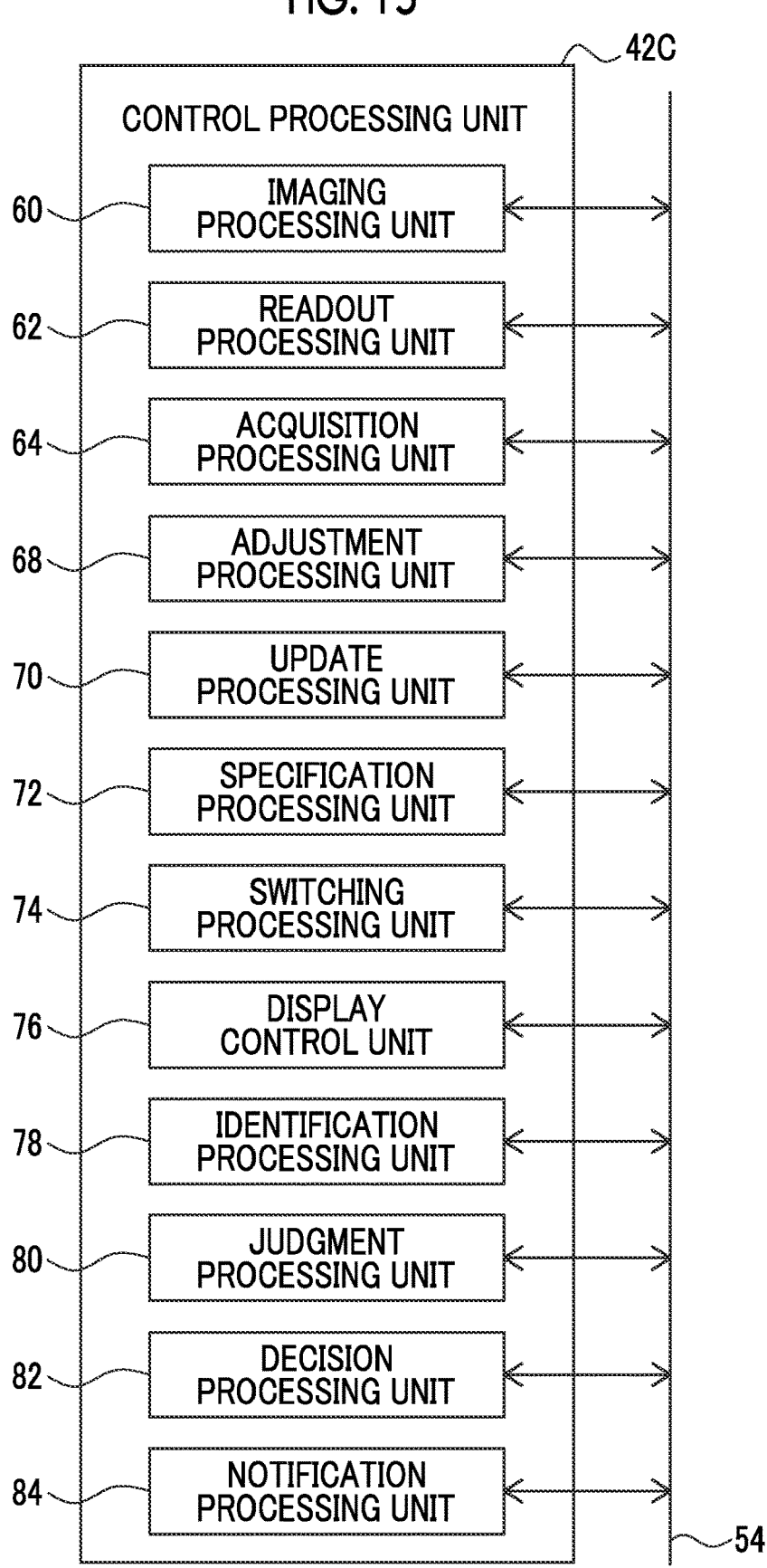
FIG. 15 is a block diagram of an example illustrating a configuration of a control processing unit of an imaging apparatus according to a third embodiment.

In the third embodiment, the control processing unit 42C targets an adjustable lens out of the first correction lens 32*a* of the first observation unit 30A and the second correction lens of the second observation unit 30B and adjusts the correction amount of the ray angle by the lens. Specifically, in a case where the user looks at inside the first observation unit 30A or inside the second observation unit 30B, and the correction amount of the ray angle by the correction lens of the observation unit at which the user looks can be adjusted, the control processing unit 42C adjusts the optical power of the correction lens. As illustrated in FIG. 15, the control processing unit 42C comprises the imaging processing unit 60, the readout processing unit 62, the acquisition processing unit 64, the adjustment processing unit 68, the update processing unit 70, the specification processing unit 72, the switching processing unit 74, the display control unit 76, the identification processing unit 78, a judgment processing unit 80, a decision processing unit 82, and a notification processing unit 84.

As in the first embodiment, the control processing unit 42C can exchange data with the connecting unit 14, the imaging element 20, the rear surface display 22, the operating unit 24, the internal clock 37, the communication interface 38, the internal memory 50, and the memory card 52 through the internal bus 54. In addition, the imaging processing unit 60, the readout processing unit 62, the acquisition processing unit 64, the adjustment processing unit 68, the update processing unit 70, the specification processing unit 72, the switching processing unit 74, the display control unit 76, the identification processing unit 78, the judgment processing unit 80, the decision processing unit 82, and the notification processing unit 84 of the control processing unit 42C are also connected to each other through the internal bus 54 and can exchange data with each other.

Differences between the control processing unit 42A of the first embodiment and the control processing unit 42C of the third embodiment are the readout processing unit 62, the judgment processing unit 80, the decision processing unit 82, the notification processing unit 84, and the like. Description of the other same constituents will not be repeated.

The readout processing unit 62 executes the readout processing of reading out data corresponding to the correction lens as a target to be adjusted out of the first vision data and the second vision data that are the data related to the visual acuity of the user, from the internal memory 50 of the imaging apparatus 10C or the memory of the second observation unit 30B.

The judgment processing unit 80 executes judgment processing of judging whether or not the second observation unit 30B is connected to the connecting unit 14.

The decision processing unit 82 executes decision processing of deciding whether or not to adjust the correction amount of the ray angle by at least one of the first correction lens 32*a* of the first observation unit 30A or the second correction lens of the second observation unit 30B based on a result of the judgment processing. In a case where a determination that the second observation unit 30B is connected to the connecting unit 14 is made in the judgment processing, the decision processing unit 82 decides whether or not to adjust the correction amount of the ray angle by the second correction lens depending on whether or not the second correction lens is an adjustable lens.

Generally, it is considered that connecting the second observation unit 30B of the external type to the connecting unit 14 means that the user tends to use the second observation unit 30B for observing the target to be imaged. Accordingly, in a case where the second observation unit 30B is connected to the connecting unit 14, the decision processing unit 82 prioritizes the second observation unit 30B over the first observation unit 30A and decides to adjust the correction amount of the ray angle by the second correction lens.

The notification processing unit 84 executes notification processing of notifying the user of information related to each of the first correction lens 32*a* and the second correction lens. In the notification processing, the user is notified of whether or not each of the first correction lens 32*a* and the second correction lens is an adjustable correction lens, whether or not the correction amounts of the ray angle by the first correction lens 32*a* and the second correction lens are adjusted, and the like.

Figure 16:
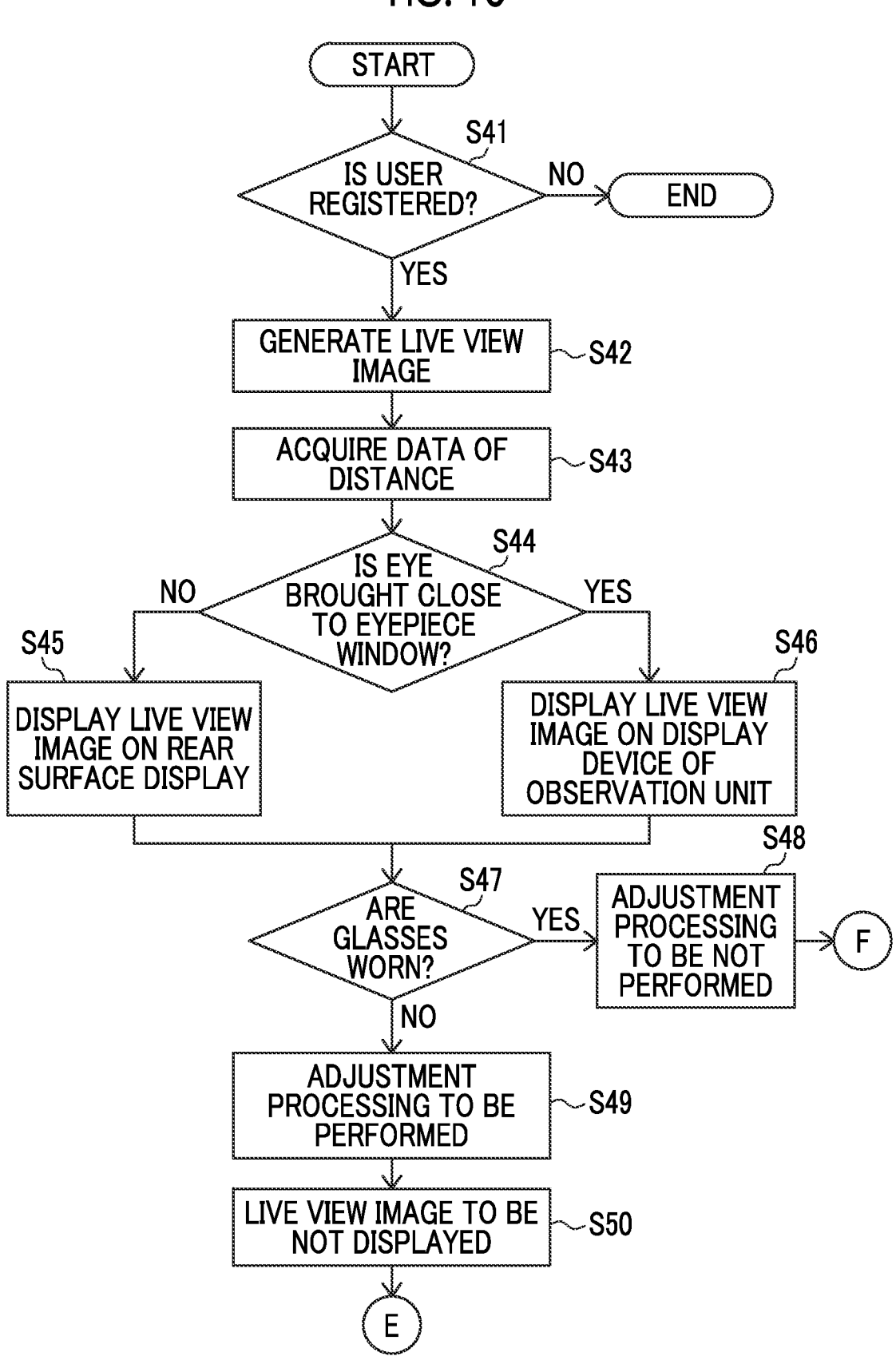
FIG. 16 is a flowchart of an example illustrating an operation of the imaging apparatus according to the third embodiment.
Figure 17:
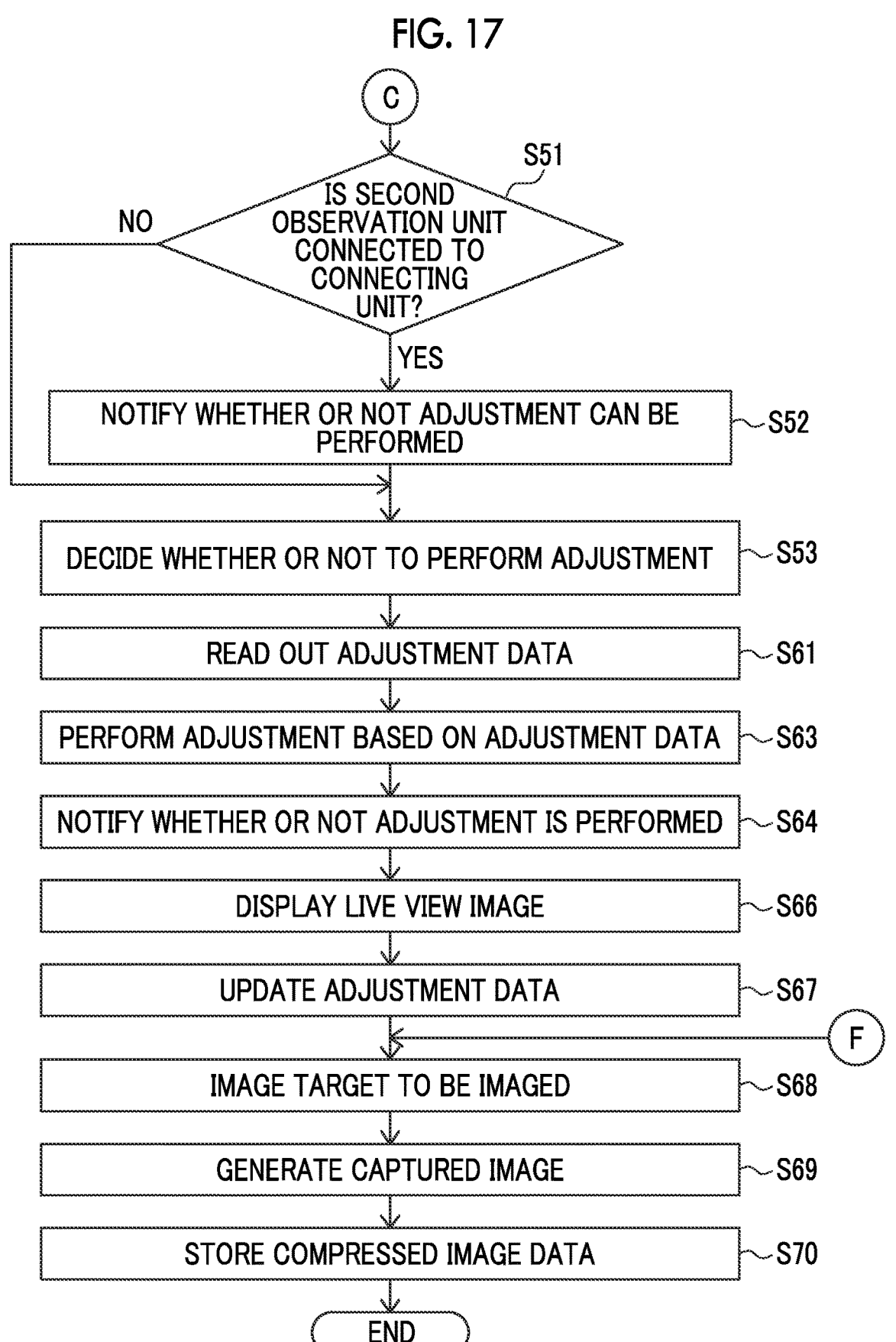
FIG. 17 is a flowchart continuing from FIG. 16 illustrating the operation of the imaging apparatus according to the third embodiment.

Next, an operation of the imaging apparatus 10C in a case of imaging the target to be imaged in the third embodiment will be described with reference to the flowcharts illustrated in FIG. 16 and FIG. 17.

An assumption that at least one of the first vision data or the second vision data is stored in a corresponding memory (the internal memory 50 and the memory of the second observation unit 30B) for each of the plurality of users as the data related to the eye of the user is made. Here, an assumption that the first vision data and the second vision data are adjustment data for adjusting the correction amounts of the ray angle by the first correction lens 32*a* and the second correction lens is made.

First, an operation from step S41 to step S50 is the same as the operation from step S1 to step S10 of the first embodiment except that two observation units (the first observation unit 30A and the second observation unit 30B) are used.

Next, the judgment processing of judging whether or not the second observation unit 30B is connected to the connecting unit 14 is executed by the judgment processing unit 80 (step S51). In a case where a determination that the second observation unit 30B is not connected to the connecting unit 14 is made in the judgment processing (NO in step S51), a transition is made to step S53.

On the other hand, in a case where a determination that the second observation unit 30B is connected to the connecting unit 14 is made in the judgment processing (YES in step S51), the notification processing of notifying the user of whether or not the correction amounts of the ray angle by the first correction lens 32*a* and the second correction lens can be adjusted is executed by the notification processing unit 84 (step S52).

Next, the decision processing of deciding whether or not to adjust the correction amounts of the ray angle by the first correction lens 32*a* of the first observation unit 30A and the second correction lens of the second observation unit 30B based on the result of the judgment processing is executed by the decision processing unit 82 (step S53).

The decision in the decision processing is divided into three cases below.

(Case 1) A case where a determination that the second observation unit 30B is connected to the connecting unit 14 is made in the judgment processing, and the second correction lens is adjustable.

In this case, the adjustment of the second correction lens is prioritized over the adjustment of the first correction lens 32*a*. That is, in Case 1, a decision that the correction amount of the ray angle by the second correction lens is adjusted instead of adjusting the correction amount of the ray angle by the first correction lens 32*a* regardless of whether or not the first correction lens 32*a* is adjustable is made in the decision processing.

(Case 2) A case where a determination that the second observation unit 30B is connected to the connecting unit 14 is made in the judgment processing, and the second correction lens is not adjustable.

In this case, the correction lens is not adjusted. That is, in Case 2, a decision that the correction amount of the ray angle by the first correction lens 32*a* is not adjusted regardless of whether or not the first correction lens 32*a* is adjustable is made in the decision processing. In addition, a decision that since the second correction lens is not adjustable, the correction amount of the ray angle by the second correction lens is not adjusted is made.

(Case 3) A case where the second observation unit 30B is not connected to the connecting unit 14 is made in the judgment processing.

In this case, since the second observation unit 30B is not connected to the connecting unit 14, and only the first observation unit 30A is present, the first correction lens 32*a* is adjusted. That is, in Case 3, a decision that the second correction lens is not present, and the correction amount of the ray angle by the first correction lens 32*a* is adjusted is made in the decision processing.

Next, the readout processing of reading out the data corresponding to the correction lens as the target to be adjusted out of the first vision data and the second vision data as the data related to the eye of the user in use identified by the identification processing is executed by the readout processing unit 62 (step S61).

Next, the adjustment processing is executed by the adjustment processing unit 68 based on the adjustment data (that is, the first vision data or the second vision data of the user in use) related to the eye of the user in use read out in the readout processing (step S63). In the adjustment processing, the correction amount of the ray angle by the correction lens as the target to be adjusted out of the first correction lens 32*a* and the second correction lens is adjusted.

Next, the notification processing of notifying the user of whether or not the correction amounts of the ray angle by the first correction lens 32*a* and the second correction lens are adjusted is executed by the notification processing unit 84 (step S64).

By performing the adjustment processing based on the data related to the eye of the user, the user in use can favorably view the live view image and the like displayed on the display device 31.

A subsequent operation from step S66 to step S70 is the same as the operation from step S16 to step S20 of the first embodiment.

The user in use can use the first observation unit 30A incorporated in the imaging apparatus 10C and the second observation unit 30B of the external type by switching therebetween. In addition, in a case where the second observation unit 30B is connected to the imaging apparatus 10C, it is considered that the user uses the first observation unit 30A in a prioritized manner over the second observation unit 30B. Considering this point, as long as the second observation unit 30B is connected to the connecting unit 14, and the second correction lens is adjustable, only the correction amount of the ray angle by the second correction lens is adjusted in the adjustment processing. Accordingly, the adjustment of the correction amount of the ray angle by the correction lens can be reasonably performed.

In a case where a determination that the second observation unit 30B is not connected to the imaging apparatus 10C is made in the judgment processing, the decision processing unit 82 may decide whether or not to adjust the correction amount of the ray angle by the first correction lens 32*a* depending on whether or not the first correction lens 32*a* is adjustable. That is, in a case where a determination that the second observation unit 30B is not connected to the connecting unit 14 is made, and the first correction lens 32*a* is adjustable, the decision processing unit 82 may decide to adjust the correction amount of the ray angle by the first correction lens 32*a*.

On the other hand, in a case where a determination that the second observation unit 30B is not connected to the connecting unit 14 is made by the judgment processing, and the first correction lens 32*a* is not adjustable, the decision processing unit 82 decides not to adjust the correction amount of the ray angle by the first correction lens 32*a*.

Two or more of the first embodiment, the second embodiment, and the third embodiment may be combined. In addition, content that can be applied to each embodiment can also be applied to other embodiments.

For example, the data related to the astigmatism of the user may be stored in the storage unit, and a liquid crystal lens, a liquid lens, or the like in which the correction amount of the ray angle by the correction lens can be adjusted for each region of the correction lens may be used as the correction lens. In this case, the adjustment processing unit may adjust the correction amount of the ray angle by the correction lens for each region of the correction lens based on the data related to the astigmatism of the user read out by the readout processing. Alternatively, the processor 40C may adjust the correction amount of the ray angle by the correction lens by considering the degree of each of astigmatism and presbyopia of the user.

Each of the processors 40A, 40B, and 40C may be composed of one or a plurality of hardware devices, for example, a central processing unit (CPU), a field programmable gate array (FPGA), a digital signal processor (DSP), an application specific integrated circuit (ASIC), a graphics processing unit (GPU), a micro-processing unit (MPU), or other integrated circuits (ICs). Alternatively, each of the processors 40A, 40B, and 40C may be composed of a combination thereof. In addition, in each of the processors 40A, 40B, and 40C, as represented by a system on chip (SoC) or the like, functions of the entirety of each of the processors 40A, 40B, and 40C may be configured in one integrated circuit (IC) chip. The above hardware configuration of the processors 40A, 40B, and 40C may be implemented by an electric circuit (circuitry) in which circuit elements such as semiconductor elements are combined.

EXPLANATION OF REFERENCES

10A, 10B, 10C: imaging apparatus
12: imaging lens
12a: zoom lens
12b: focus lens
14: connecting unit
16: stop
18: shutter
20: imaging element
22: rear surface display
24: operating unit
24a: release button
26: touch panel
30: observation unit
30A: first observation unit
30B: second observation unit
31: display device
32: observation optical system
32a: correction lens
33: eyepiece window
34: sensor
35: posture sensor
36: brightness sensor
37: internal clock
38: communication interface
39: lens adjustment mechanism
40A, 40B, 40C: processor
42A, 42B, 42C: control processing unit
44: image generation unit
46a, 46b: lens drive unit
50: internal memory
52: memory card
54: internal bus
60: imaging processing unit
62: readout processing unit
64: acquisition processing unit
66: determination processing unit
68: adjustment processing unit
63: correction processing unit
70: update processing unit
72: specification processing unit
74: switching processing unit
76: display control unit
78: identification processing unit
80: judgment processing unit
82: decision processing unit
84: notification processing unit
What is claimed is:

1. An imaging apparatus comprising:
an imaging element;
an observation unit that includes a correction lens for correcting a ray angle incident on an eye of a user, and with which a target to be imaged of the imaging element is observable;
a storage unit that stores data related to astigmatism of the user; and
a processor that controls the correction lens,
wherein the processor is configured to execute:
readout processing of reading out the data from the storage unit;

determination processing of determining an inclination of a second direction of the imaging element with respect to a first direction of the eye of the user; and
adjustment processing of adjusting a correction amount of the ray angle by the correction lens based on the data read out by the readout processing and a result of the determination processing.

2. The imaging apparatus according to claim 1,
wherein the processor is configured to acquire data related to an iris of the user and execute the determination processing based on the acquired data related to the iris.

3. The imaging apparatus according to claim 1,
wherein the processor is configured to acquire data related to a three-dimensional shape of a face of the user and execute the determination processing based on the acquired data related to the three-dimensional shape of the face.

4. The imaging apparatus according to claim 1,
wherein the data related to the astigmatism stored in the storage unit includes adjustment data for the correction amount of the ray angle,
the processor is configured to read out the adjustment data from the storage unit in the readout processing and adjust the correction amount of the ray angle by the correction lens based on the adjustment data read out by the readout processing, in the adjustment processing, and
the processor is configured to, in a case where the correction amount of the ray angle is manually adjusted by the user after the adjustment processing, update the adjustment data stored in the storage unit based on the correction amount of the ray angle manually adjusted by the user.

5. The imaging apparatus according to claim 1,
wherein the processor is configured to:
execute specification processing of specifying whether or not the user is wearing glasses; and
switch whether or not to perform the adjustment processing based on a result of the specification processing.

6. The imaging apparatus according to claim 1,
wherein the observation unit includes a display device on which an image is displayed, and
the processor is configured not to display the image on the display device during the execution of the adjustment processing.

7. The imaging apparatus according to claim 1,
wherein the storage unit stores the data related to the astigmatism for a plurality of users,
the processor is configured to execute identification processing of identifying a user in use who is using the imaging apparatus from the plurality of users, and
the processor is configured to read out the data related to the astigmatism of the user in use identified by the identification processing from the storage unit and adjust the correction amount of the ray angle by the correction lens based on the data related to the astigmatism of the user in use.

8. An imaging apparatus comprising:
an imaging element;
an observation unit that includes a correction lens for correcting a ray angle incident on an eye of a user, and with which a target to be imaged of the imaging element is observable;
a storage unit that stores data corresponding to an optical characteristic of each region of a lens of glasses used by the user; and a processor that controls the correction lens, wherein in the correction lens, a correction amount of the ray angle by the correction lens is adjustable for each region of the correction lens, and the processor is configured to execute:

readout processing of reading out the data from the storage unit; and adjustment processing of adjusting the correction amount of the ray angle by the correction lens for each region of the correction lens based on the data read out by the readout processing.

9. The imaging apparatus according to claim 8, wherein the data stored in the storage unit is adjustment data corresponding to the optical characteristic of each region of the lens of the glasses based on data of a prescription slip corresponding to the glasses, and the processor is configured to read out the adjustment data from the storage unit in the readout processing.

10. The imaging apparatus according to claim 9, wherein the adjustment data is adjustment data of a single lens out of a pair of lenses of the glasses.

11. The imaging apparatus according to claim 8, wherein in a case where the lens of the glasses is divided into a plurality of regions in an up-down direction of the lens of the glasses, each of a plurality of regions in the correction lens is associated with at least one of the plurality of regions in the lens of the glasses, and the processor is configured to adjust the correction amount of the ray angle for each region of the correction lens based on data corresponding to the optical characteristic of the associated region among the plurality of regions in the lens of the glasses.

12. The imaging apparatus according to claim 8, wherein the observation unit includes a display device on which an image is displayed, and the processor is configured to execute:

correction processing of correcting the image displayed on the display device based on the data read out by the readout processing; and first display processing of displaying the image corrected by the correction processing on the display device.

13. The imaging apparatus according to claim 12, wherein the processor is configured to execute second display processing of controlling an image during the execution of the adjustment processing not to be displayed on the display device.

14. The imaging apparatus according to claim 8, wherein the storage unit stores adjustment data for the correction amount of the ray angle, the adjustment data for the correction amount of the ray angle includes first adjustment data corresponding to the optical characteristic of each region of the lens of the glasses worn by the user, and the processor is configured to:

execute specification processing of specifying whether or not the user is wearing glasses; and switch whether or not to perform the adjustment processing using the first adjustment data based on a result of the specification processing.

15. The imaging apparatus according to claim 8, wherein the storage unit stores the data for a plurality of users, the processor is configured to execute identification processing of identifying a user in use who is using the imaging apparatus from the plurality of users, and the processor is configured to read out the data of the user in use identified by the identification processing from the storage unit and adjust the correction amount of the ray angle by the correction lens based on the data of the user in use.

16. An imaging apparatus comprising:

an imaging element;

a first observation unit that includes a first correction lens for correcting a ray angle incident on an eye of a user, and with which a target to be imaged of the imaging element is observable;

a connecting unit to which a second observation unit that includes a second correction lens for correcting the ray angle incident on the eye of the user, and with which the target to be imaged of the imaging element is observable is connectable;

a storage unit that stores data based on the eye of the user with respect to correction of at least one correction lens out of the first correction lens or the second correction lens; and a processor that controls the at least one correction lens, wherein the processor is configured to execute:

judgment processing of judging whether or not the second observation unit is connected to the connecting unit; and decision processing of deciding whether or not to adjust a correction amount of the ray angle by the at least one correction lens based on a result of the judgment processing.

17. The imaging apparatus according to claim 16, wherein the processor is configured to, in a case where a determination that the second observation unit is connected to the connecting unit is made by the judgment processing, and the second correction lens is correctable, adjust the correction amount of the ray angle by the second correction lens instead of adjusting the correction amount of the ray angle by the first correction lens.

18. The imaging apparatus according to claim 16, wherein the processor is configured to, in a case where a determination that the second observation unit is connected to the connecting unit is made by the judgment processing, and the second correction lens is not correctable, not adjust the correction amount of the ray angle by the first correction lens.

19. The imaging apparatus according to claim 16, wherein the processor is configured to execute notification processing of notifying the user of at least one of whether or not the correction amounts of the ray angle by the first correction lens and the second correction lens are adjustable, or whether or not the correction amounts of the ray angle by the first correction lens and the second correction lens are adjusted.

20. An imaging apparatus comprising:

an imaging element;

an observation unit that includes a correction lens for correcting a ray angle incident on an eye of a user, and with which a target to be imaged of the imaging element is observable;

a storage unit that stores data related to astigmatism of the user; and a processor that controls the correction lens, wherein in the correction lens, a correction amount of the ray angle by the correction lens is adjustable for each region of the correction lens, and the processor is configured to execute:

readout processing of reading out the data from the storage unit; and adjustment processing of adjusting the correction amount of the ray angle by the correction lens for each region of the correction lens based on the data read out by the readout processing.

21. The imaging apparatus according to claim 20, wherein the storage unit stores the data related to the astigmatism for a plurality of users, the processor is configured to execute identification processing of identifying a user in use who is using the imaging apparatus from the plurality of users, and the processor is configured to read out the data related to the astigmatism of the user in use identified by the identification processing from the storage unit and adjust the correction amount of the ray angle by the correction lens based on the data related to the astigmatism of the user in use.

* * * * *